United States Patent

[11] 3,597,752

[72] Inventors Cornelius Eldert
Bloomfield Hills;
Virgilio J. Quiogue, Northville, both of, Mich.

[21] Appl. No. 858,727
[22] Filed Sept. 17, 1969
[45] Patented Aug. 3, 1971
[73] Assignee Burroughs Corporation
Detroit, Mich.

[54] FM MAGNETIC RECORDING AND SENSING UTILIZING BIT PERIODS OF DIFFERENT LENGTHS
34 Claims, 15 Drawing Figs.

[52] U.S. Cl. ..... 340/174.1 H, 340/174.1 G, 346/74 M
[51] Int. Cl. ..... G11b 5/04
[50] Field of Search ..... 340/174.1 B, 174.1 G, 174.1 H; 346/74 M

[56] References Cited
UNITED STATES PATENTS
3,281,806 10/1966 Lawrance et al. ..... 340/174.1 G
3,483,539 12/1969 Poumakis ..... 340/174.1 H

*Primary Examiner*—Bernard Konick
*Assistant Examiner*—J. Russell Goudeau
*Attorneys*—Kenneth L. Miller and Wallace P. Lamb

ABSTRACT: A method and apparatus for recording or sensing digital data on a magnetizable surface, for example, a magnetic stripe. The method utilizes bit periods of different lengths to represent binary coded "1's" and "0's" respectively. The presence of a binary "1" or an "0" on the magnetic surface is determined by a threshold value, i.e., in the digital mode a binary count which is computed as a function of the period of at least one preceding data bit for binary comparison with the period duration of the data bit being sensed.

INVENTORS.
CORNELIUS ELDERT.
VIRGILIO J. QUIOGUE.

| STATE | F0 | F1 |
|---|---|---|
| RS 0 | 0 | 0 |
| RS I | 1 | 0 |
| RS II | 0 | 1 |
| RS III | 1 | 1 |
| RS 0 | 0 | 0 |

FM MAGNETIC RECORDING AND SENSING UTILIZING BIT PERIODS OF DIFFERENT LENGTHS

BACKGROUND OF THE INVENTION

In the past, the techniques for recording digital data on a magnetic surface employed a variety of voltage dependent systems. The systems ranged from "return-to-zero" (RZ) to "-nonreturn-to-zero" (NRZ) and variations thereof. As a result of the rigid voltage requirements necessary to detect the coded data and other limitations, the systems resulted in low data packing densities which require tight speed and rigid magnetic property specifications.

SUMMARY OF THE INVENTION

It is accordingly an object of the present invention to provide an improved method for recording and sensing digital information on a magnetic surface by utilizing the duration of the period of a bit of said information essentially independent of the amplitude of said bit.

Another object of the invention is to accommodate a broad range of magnetic surfaces having varied characteristics and to eliminate the necessity of trimming or adjusting the sensing apparatus.

A further object of the invention is to provide a magnetic recording and sensing method having good noise immunity as a result of minimal analog processing of the read-back signals and by employing a narrow bandwidth and a simple band-pass filter.

An important aspect aspect of the invention is that in one embodiment of the invention the processing of the signal after initial amplification from the read/write head is completely digital, thus readily lending the apparatus fabrication to large scale integrated circuits.

Another aspect of the invention is the insensitivity of the method to low-frequency transport velocity variations of the magnetic surface as it moves relative to the transducer.

Another aspect of the invention is the improved design of the system eliminating the necessity of trimming or adjusting said system to compensate for normal end of component life variation.

BRIEF DESCRIPTION OF THE DRAWING

The objects, aspects and advantages of the invention will be more clearly understood from the following description when read in conjunction with the accompanying drawings, in which.

DETAILED DESCRIPTION OF THE INVENTION

Figure 1:
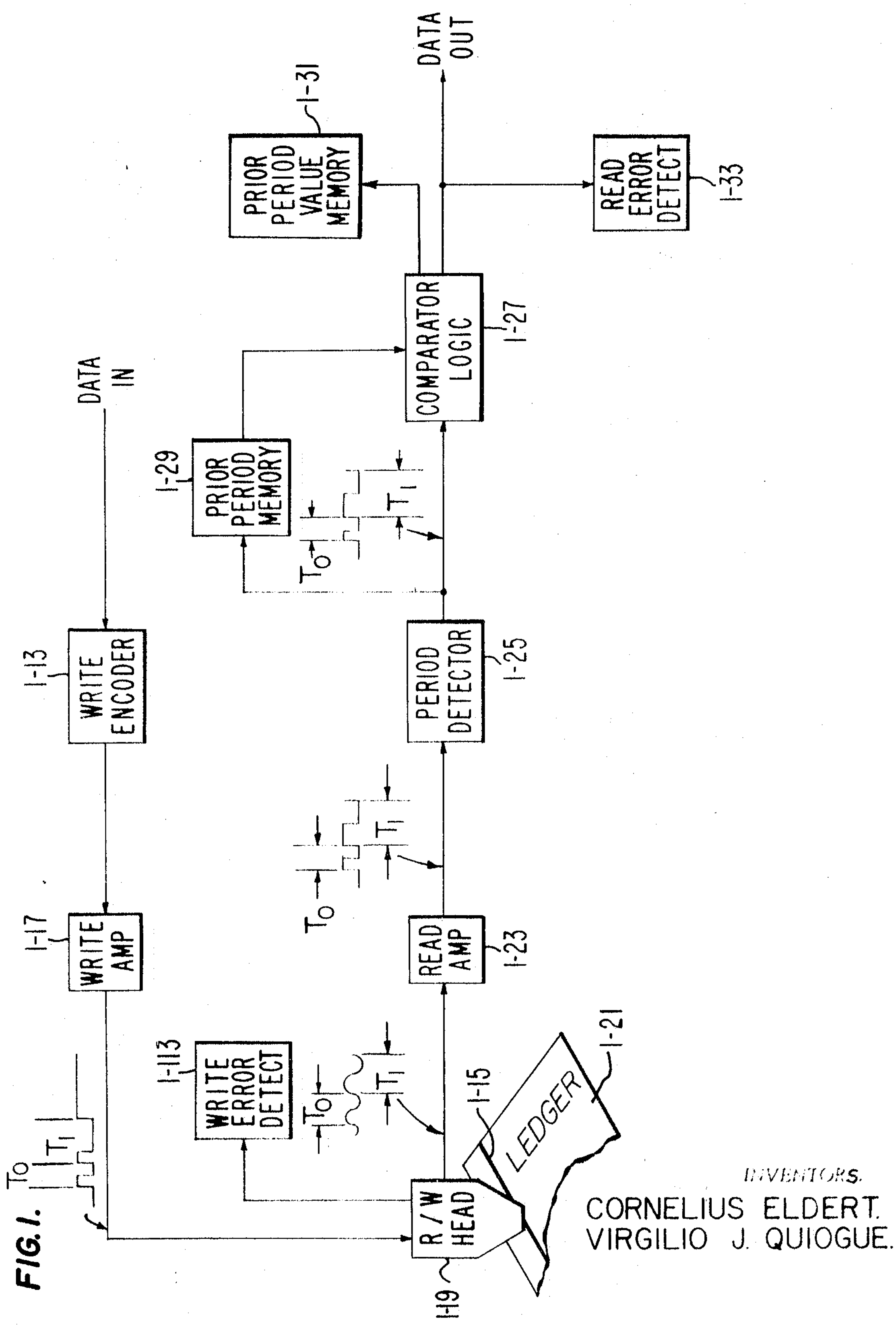
FIG. 1 is a simplified block diagram of the applicant's magnetic recording and sensing apparatus.

Referring now to FIG. 1, there is shown a partial block diagram of the apparatus used for frequency modulated recording and sensing of information on a magnetic surface utilizable in accordance with the principles of the present invention. In writing information on a magnetic surface 1–15, the input data is encoded in a write encoder 1–13. In the present embodiment of the invention, binarily coded data will be used. This is not meant to limit the invention to the exclusive use of binary code. Once the data has been encoded, the signal enters the [write] amplifier 1–17 of any well-known construction where it is shaped and amplified. The amplified signal then proceeds to a magnetic transducer 1–19 which writes the binarily coded data on a magnetic surface 1–15 by means of flux reversals. The present embodiment of the invention employs two flux reversals per bit, however, this is not intended to limit the number of flux reversals per bit to two as one or more flux reversals per bit may be used. The magnetic surface 1–15 utilized in the present embodiment is a magnetic stripe on a striped ledger card 1–21, however, any other magnetizable surface may be utilized in practicing the subject invention. Since the present invention is read voltage amplitude insensitive, it can tolerate more spacing, "lift-off," between the transducer 1–19 and the magnetic surface 1–15.

In sensing recorded data, the relative motion between the transducer 1–19 and the magnetic surface 1–15 induces a voltage, as a result of flux reversals, in the transducer 1–19. The signals induced in the transducer enter a high-gain read amplifier 1–23 which shapes rather than amplifies the signal. The output of the read amplifier 1–23 is essentially a square wave output which has not been effected with respect to the duration of the periods of the signal. The output of the read amplifier 1–23 enters the time or period detector 1–25 where the time duration or length of each period is detected. In the present embodiment, one period is representative of one bit of information, however, this is not intended to limit the number of periods per bit to one as one-half or more periods per bit may be used. The output of the period detector 1–25 enters the comparator logic unit 1–27 for processing and also enters the prior period memory 1–29, the function of which will be described hereinafter.

The prior period memory 1–29 stores the period length of a predetermined number of prior bits. In the present embodiment, the prior period memory 1–29 which may comprise a counter stores the period lengths of the two prior periods. The period lengths of the prior periods determine a threshold which is utilized in determining the value of the bit presently being processed. At the initiation of a sensing procedure, known values are entered into the prior period memory 1–29 by the transmission of a leader. The leader may comprise a series of pulses having known values, for example, all "1's" or all "0's" or a combination thereof. The function of the leader will be described hereafter in more detail.

The comparator logic unit 1–27 has two inputs; the first, the output of the period detector 1–25, and the second, the output of the prior period memory 1–27. The comparator logic unit 1–27 compares the length of the period being processed with the threshold. The period being processed will be greater than or less than the threshold and, as a result, the processed period will have the value of a "1" or a "0" respectively. The comparator logic unit 1–27 has two outputs; the first, the output to the prior period value memory 1–31 for use in determining the threshold for the next two succeeding pulses, and the second, the output to the utilization means. The second output of the comparator logic unit 1–27 is also sent to a read-error detect 1–33 to determine if an error exists in the sensed data. The read-error detect 1–33 can be any one of a series of error detectors well known in the art. The read-error detect of the present embodiment checks the parity of the sensed data bit.

Figure 2:
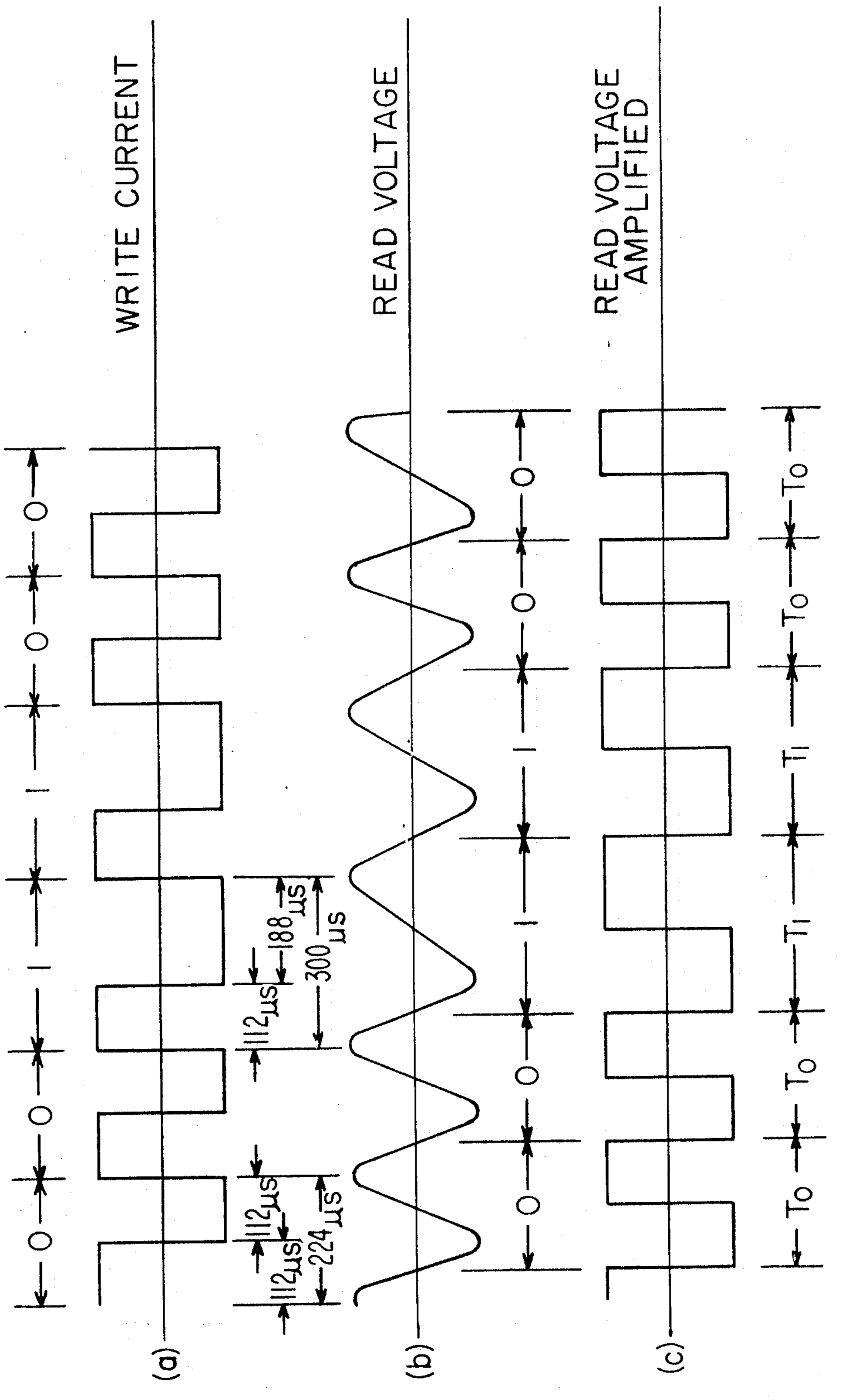
FIG. 2 is a partial timing diagram of some of the waveforms employed in recording and sensing data in accordance with one aspect of the claimed invention.

Referring now to FIG. 2, there is shown a series of waveforms utilized in the present invention. The three waveforms shown, the write current (*a*), the read voltage (*b*) and the read voltage amplified (*c*) are aligned with respect to time and they represent the binary coded value of 001100.

Referring specifically to the write current (*a*) of FIG. 2, it can be seen that the waveform is essentially square; the primary distinction between the binary coded values of "1" and "0" being the difference in the period duration or time lengths of the two values. The write "0" has a total period or length of 224 microseconds comprised of 112 microseconds for the first portion of the period, the period above the reference line, and 112 microseconds for the second portion of the period, the portion located below the reference line. The write "1" has a total period of 300 microseconds comprised of 112 microseconds for the first portion of the period, the portion located above the reference line, and 188 microseconds for the second portion of the period, the portion located below the reference line. The specific differences between the periods having the values of "1" and "0" will be more fully explained hereafter. Generally speaking, the period of the bit representing a binarily coded "1" is longer than the period of the bit representing a binarily coded "0."

Referring to the read-voltage waveform (*b*), as is known, it comprises the derivative of the write flux and thus it leads the write current (*a*) by 90°. The read-voltage waveform (*b*) is fed into the read amplifier 1–23 and the resulting read-voltage waveform amplified (*c*) is the waveform which is processed. In the read-voltage waveform (*b*), the period length of a bit having the binary value "1" tends to be somewhat longer than normal when it is preceded by a bit having the binary value "0." Similarly, the period length of a bit having the binary value "0" tends to be somewhat shorter in length when it is preceded by a bit having the binary value "1." This slight irregularity in the read voltage is not sufficient enough to produce error.

Referring to the read-voltage amplified waveform (*c*), it can be seen that the output of the read amplifier 1–23 results in a squared wave. The amplifier utilized as the read amplifier 1–23 is a saturated amplifier with only a minimum voltage amplification requirement; its primary purpose being to shape the read voltage.

In the read-voltage amplified waveform (*c*), $T_0$ is a period having the binary value "0" and a length of 224 microseconds. $T_1$ is a period having the binary value of "1" and a length of 300 microseconds. The ratio of $T_1$ over $T_0$; i.e., $T_1/T_0$, is in this instance equal to 1.34. The ratio of $T_1/T_0=1.34$ is a parameter of the system and is determinative of the allowable noise the system can withstand without substantially effecting performance. The ratio is also dependent upon the resolution and defects of the magnetic surface 1–15 and upon the constancy of the bit-to-bit relative speed between the transducer 1–19 and the magnetic surface 1–15.

The ratio of $T_1/T_0=1.34$ is the preferred ratio for the present embodiment. The ratio of $T_1/T_0$ may be different in other embodiments as noise, resolution, defects and bit-to-bit relative speed considerations dictate. The period lengths of the bits having the values "1" and "0" can be set at any lengths in accordance with the principles of the subject invention and, as a result, recording and sensing may be performed at a variety of frequencies. It is also within the principles of the subject invention to use higher ordered codes and thus have multiple ratios; for example, a tertiary code where $T_0$, $T_1$, and $T_2$ represent values of "0," "1," and "2" respectively and all have different period lengths. The resulting ratios for a tertiary code would be $T_1/T_0$, $T_2/T_1$, and $T_2/T_0$.

The read-back ratio of $T_1/T_0=1.34$ is approached when the magnetizable surface has a good resolution. As the resolution of the magnetic surface gets poorer, the read-back ratio $T_1/T_0$ becomes greater than 1.34 while the presence of defects may result in a read-back ratio of less than 1.34. The subject invention may be practiced with the read-back ratio of $T_1/T_0$ ranging from a lower limit of 1.22 to an upper limit of 1.8 for the present embodiment.

Figure 3:
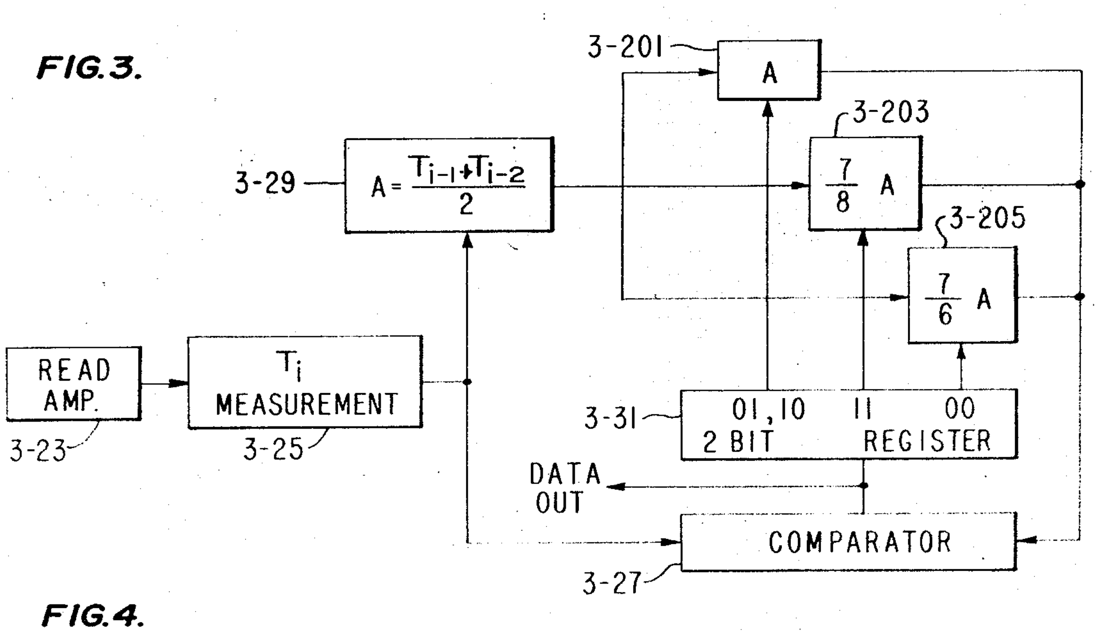
FIG. 3 is a block diagram of the measurement and decision logic portion of FIG. 1.

Referring now to FIG. 3, there is shown a more detailed block diagram of applicant's measurement and decision logic comprising the period detector 3–25, herein referred to as $T_i$ measurement, the prior period memory 3–29, a multiply by one logic unit 3–201, a multiply by 7/8 logic unit 3–203, a multiply by 7/6 logic unit 3–205, the prior period value memory 3–31, and the comparator 3–27. The output of the read amplifier 3–23 enters the $T_i$ measurement 3–25 where the period of $T_i$ is determined. $T_i$ represents the period of the last bit read and presently being processed.

The prior period memory 3–29 contains the value "*A*" with $A=(T_{i11}+T_{i12}/2)$. The value of "*A*" represents the average of the periods of the 2 data bits immediately preceding $T_i$; i.e. $T_{i11}$ and $T_{i12}$. The prior period value memory 3–31, which may be a two bit register, contains the values of the two preceding bits, $T_{i11}$ and $T_{i12}$. Depending upon the values of the two preceding bits stored in the prior period value memory 3–31, the contents of the prior period memory 3–29, "A," will be acted upon by either the multiply by one logic unit 3–201, the multiply by 7/8 logic unit 3–203, or the multiply by 7/6 logic unit 3–205. The multiply logic units 3–201, 3–203, 3–205 by acting upon the contents of the prior period memory 3–29, "A," determine a threshold value which will be used to determine the value of $T_i$. The value of $T_i$ is determined by comparing in the comparator 3–27 the threshold value with the period of $T_i$. The multiplying logic units 3–201, 3–203, 3–205 may be gated multipliers which multiply an input by a predetermined constant.

If the values of the preceding two periods are 01 or 10, then the value of "A"$=(T_{i11}+T_{i12})/2$ is equal to 524/2 is equal to 262. Since the values of the two preceding bits are "01" or "10,"$A=262$ is multiplied by the multiply by one logic unit 3–201 to arrive at the threshold which is fed into the comparator 3–27. The other input into the comparator 3–27 is the period of $T_i$, the output of the $T_i$ measurement 3–25. If the period of $T_i$ is less than the threshold value, then the data bit value of $T_i$ is "0"; and if the period of $T_i$ is greater than the threshold value, the data bit value of $T_i$ is "1."

If the two prior periods have the values of "11," then the value of "*A*," $A=(T_{i11}+T_{i12}/2$, is 300. This value of "*A*" is then multiplied by 7/8 in the multiply by 7/8 logic unit 3–203 to arrive at the threshold value of 262. This threshold value is then fed into the comparator 3–27 together with the period of $T_i$.

If the value of the two preceding periods is "00" then the value of "*A*," $A=(T_{i11}+T_{i12}/2$, will equal 224. "*A*" equal to 224 will then be multiplied by 7/6 in *n* multiply by 7/6 logic unit 3–205 to arrive at the threshold value of 262 which will be fed into the comparator 3–27. Although numerically 7/8×300 and 7/6×do not exactly equal 262, the threshold value, nonetheless, is rounded off to 262 microseconds as the nearest value of these two multiplying operations is 262. It should be noted that in the case of higher order codes, the number of threshold values will increase accordingly; for example, for an *n* order code there will be $n-1$ threshold values.

Figure 4:
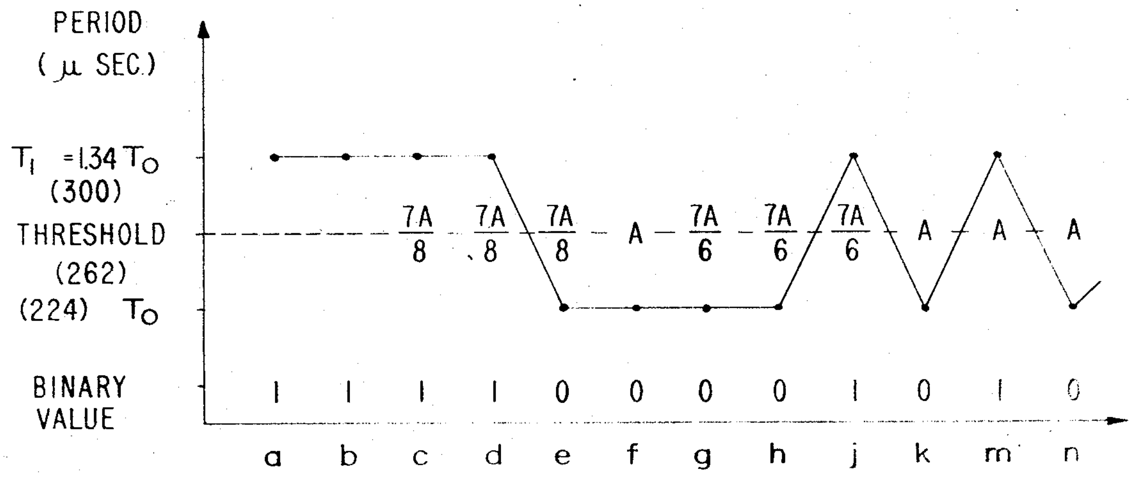
FIG. 4 is a graph representing bit sequences and their relation to periods in accordance with applicant's invention.

Referring now to FIG. 4, there is shown a graph of bit sequences and their relationship to period length in microseconds. In this graph, the ratio of $T_1/T_0$ is equal to 1.34; as a result, $T_1=1.34T_0$. In the present embodiment, each period represents one bit of information and the prior period memory 3–29 stores the period lengths of the two preceding periods. This is not intended to limit the invention to one bit per period nor to the storing of two preceding periods in the prior period memory 3–29. A bit may be represented by one or more periods or a portion thereof. The number of prior periods stored in the prior period memory 3–29 may be one or more periods or portions thereof.

At the start of the sensing operation, the prior period memory 3–29 has no prior periods stored in it. Therefore, it is necessary to insert the value of at least two known periods into the prior period memory 3–29. This is accomplished by a leader which presents a series of known bits to the system. Bits *a* and *b* of FIG. 4 comprise the leader and have the known value of "1." It should be noted that any known values may be used in the leader. In addition to inserting the values of two prior known bits into the prior period value memory 3–31, bits $a$ and $b$ provide the prior period memory 3–29 with two prior periods to allow the prior period memory 3–29 to compute "A." The value of "A" computed from bits $a$ and $b$ will be utilized in determining the value of data bit $c$. It can be seen from this that a leader, the presentation of at least two known bits to the system, is necessary before subsequent bits of data can be accurately evaluated. If a leader were not used, the first two bits of data could be lost if the system did not synchronize until after the first two bits had been sensed.

The first bit of data to be read is bit $c$. The threshold value is determined by the preceding two bits, bits $a$ and $b$. Since bits $a$ and $b$ both have the binary value of "1," "A" is equal to 300 and is multiplied by 7/8 in the multiply by 7/8 logic unit 3–203 to arrive at the system threshold used to determine the data value of bit $c$. The period of bit $c$ is compared in the comparator 3–27 with the threshold value. Since the period of bit $c$ is greater than 262 microseconds, the data value of bit $c$ is recognized as a binary "1."

The next bit to be sensed is bit $d$. The value of "A" used in determining the value of bit $d$ is dependent upon bits $b$ and $c$. Since bits $b$ and $c$ both have the binary value of "1," the value of "A" is 300 and "A" is multiplied by 7/8 in the multiply by 7/8 logic unit 3–203 to arrive at the threshold. The period of bit $d$ is compared in the comparator 3–27 with the threshold value and being larger than 262 microseconds, bit $d$ is recognized as a binary "1."

The next bit to be detected is bit $e$. The period of bits $c$ and $d$ are used to determine the value of "A." Since bit $c$ and bit $d$ both have the binary value of "1," the value "A" is multiplied by 7/8 in the multiply by 7/8 logic unit to arrive at the threshold value. Data bit $e$ has a period shorter in duration than the threshold value and is recognized as the data value "0."

The next bit to be sensed is bit $f$. The two periods used to determine the value of "A" are bits $d$ and $e$. Bit $d$ having a binary value of "1" and bit $e$ having a binary value of "0" result in the value of "A" being 262. This value of "A" is then multiplied by one in the multiply by one logic unit 3–201 to arrive at the threshold value. The threshold value is fed into the comparator 3–27 for comparison with the period of bit $f$. Since the period of bit $f$ is less than the threshold value, the value of bit $f$ is recognized as a binary "0."

Bit $g$ is the next bit to be sensed and the binary values of bits $e$ and $f$ are used to determine the value of "A." Since the binary values of bits $e$ and $f$ are both "0," the value of "A" is 224 and "A" is multiplied by 7/6 in the multiply by 7/6 logic 3–205 to arrive at the threshold value of 262 microseconds. The value of bit $g$ is recognized as a binary "0" since the period of bit $g$ is of shorter duration than the threshold. The remainder of the bits are evaluated in a manner similar to the above.

Figure 5:
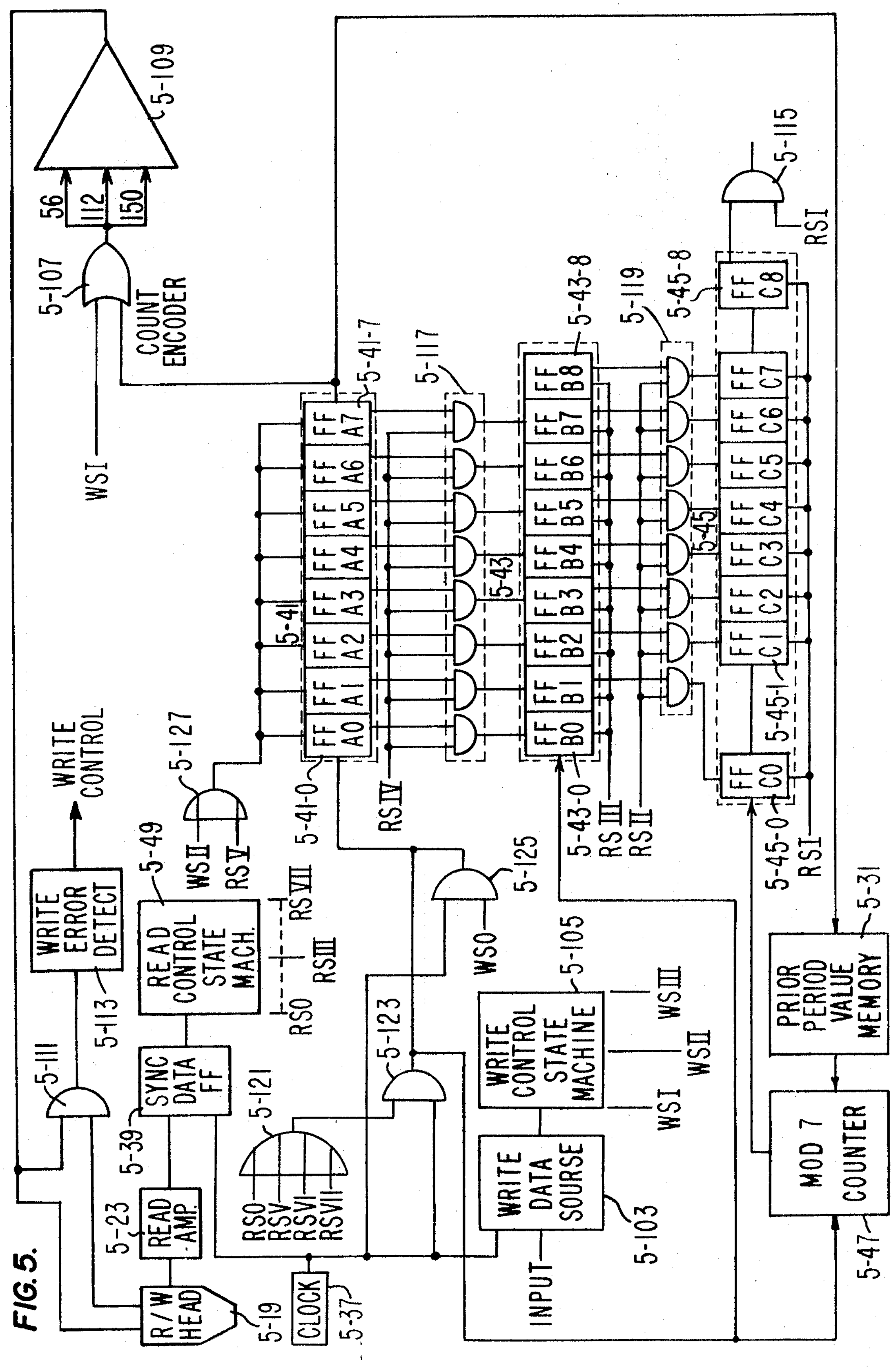
FIG. 5 is a detailed block diagram of the magnetic recording and sensing apparatus of FIG. 1.

Referring now to FIG. 5, there is shown a detailed schematic diagram of the preferred digital embodiment of the present invention. The digital embodiment, contains a transducer 5–19 and a clocking means 5–37, for example an oscillator, having a period of 2 microseconds. Included also is a sync data flip-flop 5–39 for synchronizing the sensed data with the clock pulses. Also included are three conventional binary counters, counter A 5–41, counter B 5–43 and counter C 5–45. In addition to the three counters there is a mod seven counter 5–47, whose operation will hereafter be described in detail, for modifying the count of counter C 5–45 in accordance with the value of the two preceding bits stored in the prior period value memory 5–31. The operation of the counters 5–41, 5–43, 5–45 in this embodiment is controlled by a read control state machine 5–49 which will be described in detail hereafter. Appropriate logic gating means interconnect the various elements of the digital embodiment for controlling data transfer in accordance with well known logic design principles.

Before previously recorded data bit $T_i$ can be read and evaluated, it is necessary that certain conditions be set in the system. It is necessary in the present embodiment that the periods and the values of two preceding bits be known. This function is performed by the formerly mentioned "leader." The presetting of the system can also be accomplished by setting counters A 5–41, B 5–43, and C 5–45 to predetermined values. The effect of the "leader" on the various components of the digital embodiment will now be described.

Counter A 5–41 counts and stores a count corresponding to the period of the second bit preceding $T_i$, i.e., $T_{i12}$. Counter A 5–41 transfers the count corresponding to the period of $T_{i12}$ to counter B 5–43 and resets itself to zero. The transfer of the contents of counter A 5–41 to counter B 5–43 is accomplished by AND gates 5–117. Counter B 5–43, now containing the count corresponding to the period $T_{i12}$, and counter A 5–41, set to zero, both count the period of the first bit preceding $T_i$, i.e., $T_{i11}$. At the end of the period of bit $T_{i11}$, counter B 5–43 contains the count corresponding to the two preceding periods, $(T_{i12}+T_{i11})$ and counter A 5–41 contains the count corresponding to the period of $T_{i11}$. Counter B 5–43 now transfers one-half of its count to counter C 5–45 and resets itself to zero. The transferring of one-half of the count of counter B 5–43 to counter C 5–45 is accomplished by shifting left one place and gating. This is performed by gating arrangement 5–119. The count transferred into counter C 5–45 is the value "$A$" where $A=(T_{i12}+T_{i11})/2$. The contents of counter C 5–45 are either counted down or counted up depending upon whether one-half of the count of counter B 5–43 or its complement, respectively, are transferred. In this embodiment, counter C 5–45 will be counted down as one-half of the contents of counter B 5–43 are transferred to counter C. Counter A 5–41 now transfers its count corresponding to the period of $T_{i11}$ to the counter B 5–43, which has been reset to zero, and counter A 5–41 resets itself to zero. The binary values of bits $T_{i12}$ and $T_{i11}$ are stored in the prior period value memory 5–31, a two bit register, for use in controlling the operation of the mod seven counter 5–47.

If the values of the two preceding bits stored in the prior period value memory 5–31 are "10" or "01," then counter C 5–45 is counted down by the mod seven counter 5–47 which provides an unmodified count of the clock pulses. If the prior period value memory 5–31 contains the values "11" of the two preceding bits, then the mod seven counter 5–47 provides one extra pulse for every seven clock pulses in counting down counter C 5–45. The effect of the one extra pulse for every seven clock pulses is to multiply the count of counter C 5–45 by 7/8, thereby arriving at the value "7/8 $A$." More specifically, on every seventh count, two counts are counted in counter C 5–45. This particular function of counting an extra count on every seventh count can be accomplished in one of two ways. One way is to count down two counts into the first bit position 5–45–0 of counter C 5–45; and the second way, and the method employed in the present embodiment, is to count down the second bit position 5–45–1 of counter C 5–45 once instead of counting down the first bit position 5–45–0 twice. If the values in the prior period value memory 5–31 are "00, " then the mod seven counter 5–47 modifies the count of counter C 5–45 by inhibiting every seventh pulse. The inhibiting of every seventh pulse in counting down counter C 5–45 serves to multiply the contents of counter C 5–45, "A" by 7/6.

Counter C 5–45 is counted down for the duration of the period of the bit being measured, $T_i$. The period of time required to count down counter C 5–45 to a zero count is the threshold value, 262 microseconds. At the end of the period of bit $T_i$, the ninth-bit-position 5–45–8 of counter C 5–45 is interrogated to determine whether or not the bit has changed states. If counter C 5–45 has been counted down completely, the state of the ninth-bit-position 5–45–8 of counter C 5–45 will have changed states indicating that the bit $T_i$ has the binary value of "1." If the state of the ninth-bit-position 5–45–8 of counter C 5–45 has not changed states, it is an indication that the binary value of bit $T_i$ is "0." The interrogation of the ninth-bit-position 5–45–8 of counter C 5–45 is accomplished at the end of the period of bit $T_i$ by strobing it with the trailing edge of bit $T_i$.

Figures 6, 7, 8, 10, 10A:
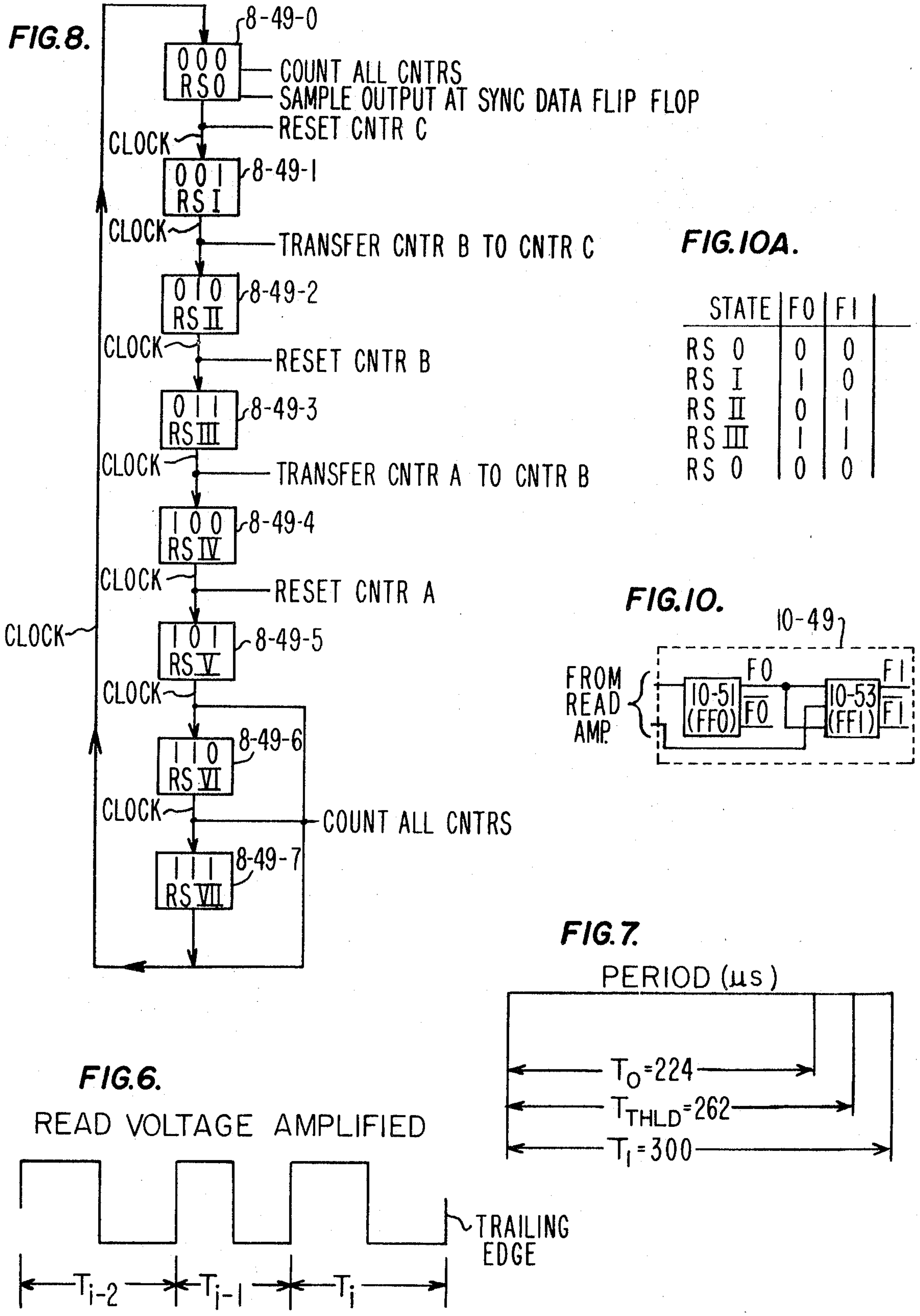
FIG. 6 is a diagram showing the waveform output of the read amplifier.
FIG. 7 is a diagram showing the relationship between the period lengths and the threshold length in accordance with applicant's invention.
FIG. 8 is a block diagram of the digital read-state machine.
FIG. 10 is a block diagram of the analog read-state machine.
FIG. 10A is a chart showing the states of the read-state machine and the states of its associated flip-flops.

FIG. 6 shows the waveform diagram of three successive bits of information. During the measurement of the period of bit $T_i$, counter A 5–41 is counting a count corresponding to the period of $T_i$; counter B 5–43 contains the count corresponding to the period of $T_{i1}$ and it is adding the count corresponding to the period of $T_i$ to it; and counter C 5–45 contains the value of "$A$" with "$A$"$=(T_{i12}+T_{i11})/2$. Depending upon the binary values of bits $T_{i11}$ and $T_{i12}$ stored in the prior period value memory 5–31, i.e., two-bit register, counter C 5–45 will be counted down by the mod seven counter 5–47 as described above.

Referring now to FIG. 7, there is shown a diagram of the relationship between the lengths of periods $T_0$, $T_1$, and the threshold, $T_{thld}$. The period $T_0$ representing a bit recognized as having the binary value "0" is 224 microseconds long and the period of $T_1$ representing a bit recognized as having the binary value "1" is 300 microseconds long. The length of the threshold, $T_{thld}$, is spaced between the lengths of the periods $T_0$ and $T_i$ as it is 262 microseconds long. The period of $T_1$, is sufficiently longer in length than the threshold $T_{thld}$to minimize any misreads which may occur by the loss of counts in measuring the period of the bit $T_i$. The same holds true for the period of $T_0$ which is substantially shorter in duration than the threshold value, $T_{thld}$. If the period of the bit being measured, $T_i$, is shorter in duration than the threshold value, $T_{thld}$, then the ninth-bit-position 5–45–8 of counter C 5–45 will not change and the binary value of bit $T_i$ will be "0." If the period of bit $T_i$ is longer in duration than $T_{thld}$, the threshold value, then the ninth-bit-position 5–45–8 of counter C 5–45 will change and the binary value of bit $T_i$ will be "1."

In the digital embodiment, another method can be used for arriving at the value of bit $T_i$. Counters A 5–41 and B 5–43 remain the same as above, except that counter B 5–43 transfers one-half of its count into counter C 5–45. The count of counter C 5–45 is then modified during the counting of the period of bit $T_i$ by a mod seven counter 5–47 which updates the count of counter C 5–45 by, in effect, multiplying the contents of counter C 5–45 by 1, 7/8, or 7/6 in accordance with the principles described above. The updated count of counter C 5–45 is then fed into one input of a standard digital comparator. The second input to the standard digital comparator is the output of counter A 5–41 which contains the count corresponding to the period of bit $T_i$. The output of the modified count of counter C 5–45 is then compared in the comparator with the output of counter A 5–41 with the result being an output from the comparator in the form of a sign bit. By interrogating the sign bit, the binary value of $T_i$ can be determined.

It is well known in the digital art that some form of timing is needed to control the gating and the flow of data. One method of timing is to provide a clock generating system. The clock generating system can be modified to provide a sequence or a variety of utilizable the read pulses. Another method of timing is the write use a state machine. A state machine consists of a series of flip-flops whose outputs are used to control the gating of data. Some state machines may have their own clocking or they may use the clocking of the system in which the state machine is operating to set the various states of the state machine. The preferred embodiment of the present invention uses a read control state machine 5–49 and a write control state machine 5–105 both of which are controlled by the clocking of the system clock 5–37. A detailed description of the read control state machine 5–49 and the write control state machine 5–105 will follow hereafter.

Figure 9A:
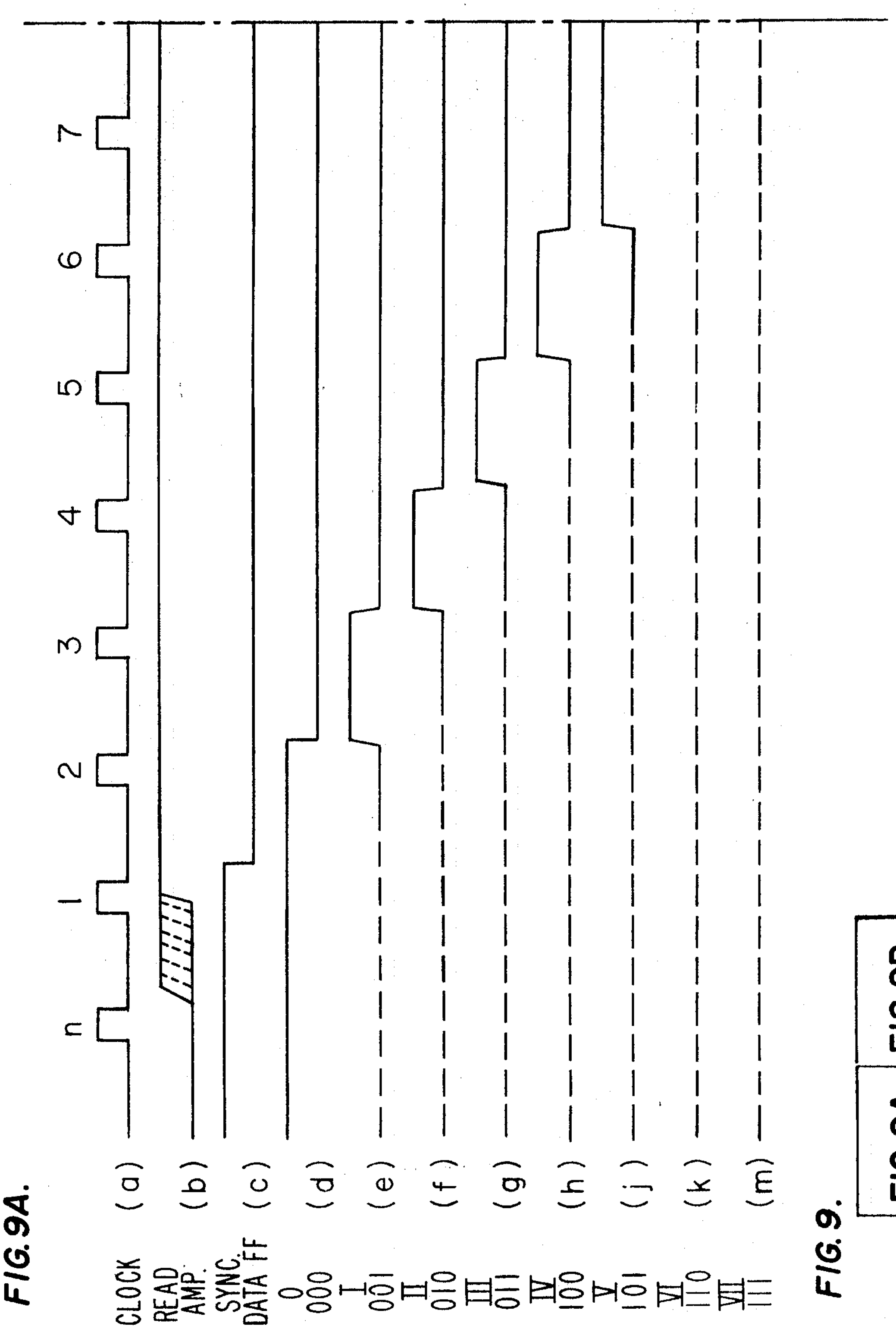
FIGS. 9A and 9B together constitute a detailed timing diagram of the read-state machine.
Figure 9:
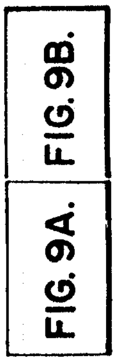
FIG. 9 is a layout depicting the arrangement of FIGS. 9A and 9B.
Figure 9B:
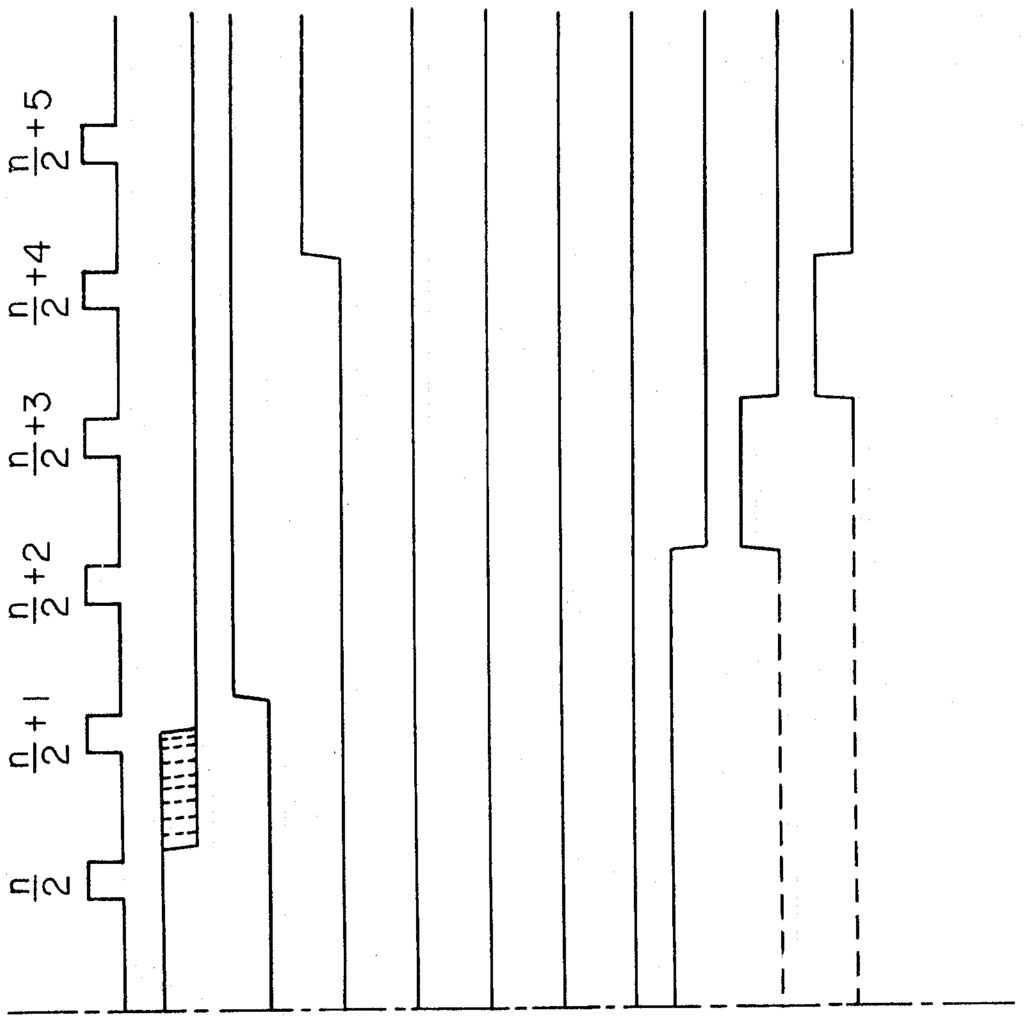

Referring now to FIGS. 8 and 9, with FIG. 9 comprising FIGS. 9A and 9B, there is shown a block diagram of the read control state machine 5–49 and a timing diagram of the waveforms employed by the read control state machine 5–49 respectively. The read control state machine 5–49 of the present embodiment has eight distinct states, read state 0 to read state VII. The various read states are designated by a 3-bit binary counter which advances from "000" to "111" and then back to "000." The states of the read control state machine 5–49 are changed by clock pulses obtained from the system clock 5–37. The various read states of the read control state machine 5–49 serve to enable AND gates to allow specific functions to be performed by the system. The read states and the timing associated with the read control state machine 5–49 will now be described in detail.

In FIG. 9, the clock pulses ($a$)are shown as a series of uniformly spaced pulses with a period of 2 microseconds. For the sake of explanation, the letter $n$ designates the last clock pulse of the period being measured, and the clock pulse immediately following it will be number 1.

With the read control state machine in read state 0; i.e., 8–49–0 the leading edge of the last bit from the read amplifier ($b$)can occur any time after the trailing edge of clock pulse $n$, but before the trailing edge of clock pulse 1. During read state 0, i.e., RSO (000) 8–49–0, the output of the sync data flip-flop ($c$) is at a high level and all of the counters of FIG. 5 are counting. In RSO 8–49–0 counters A 5–41, B 5–43 and C 5–45 are counting as a result of RSO being gated through OR gate 5–121 and serving as one input to a two input AND gate 5–123. The remaining input to AND gate 5–123 is the clock. The output of AND gate 5–123 is fed into counter A 5–41, counter B 5–43 and the mod seven counter 5–47 which in turn counts down counter C 5–45.

The output of the data sync flip-flop ($c$) is monitored by the read-control state machine 5–49 to detect a change in levels. At the trailing edge of clock pulse 1, the output of the data sync flip-flop ($c$) changes to a low level. This change indicates a change in the output level of the read amplifier ($b$). After the data sync flip-flop 5–39 has changed levels to a low level, the trailing edge of clock pulse 2 causes a change in the level of read state 0; i.e., RSO (000) ($d$) to change from a high level to a low level. This change in level changes read state 0 (000) 8–49–0 to read state I (001); i.e., RSI 8–49–1, and all counters 5–41, 5–43, 5–45 stop counting. At the trailing edge of clock pulse 2, the level of read state I; i.e., RSI (001) ($e$), changes from a low level to a high level. The change in states, from read state 0 8–49–0 to read state I 8–49–1, causes counter C 5–45 of FIG. 5 to reset; i.e., RSI is true. The change in states to read state I (001) also causes the ninth-bit-position 5–45–8 of counter C 5–45 to be interrogated. The output of the ninth-bit-position 5–45–8 is fed into a two-input AND gate 5–115 with the other input being RSI true. The output of the AND gate 5–115 indicates the state of the ninth-bit-position 5–45–8 of counter C 5–45.

The level of read state I; i.e., RSI (001) ($e$), remains at a high-level until the trailing edge of clock pulse 3. At the trailing edge of clock pulse 3, read state I ($e$) returns to a low level and causes the read control state machine 5–49 to change states to read state II, i.e. RSII (010) 8–49–2. The low level of read state II ($f$) at the trailing edge of clock pulse 3 goes to a high level. The change from read state I (001) 8–49–1 to read state II (010) 8–49–2 initiates the transfer of one-half of the contents of counter B 5–43 to counter C 5–45; i.e., RSII is true. This division by two is the result of the contents of counter B 5–43 being shifted one bit position to the left during the transfer. The shifting of one bit position to the left is accomplished by the gating arrangement 5–119 which gates the contents of bit FFB1 5–43–0 to bit FFCO 5–45–0, etc.

The level of read state II (010) ($f$) remains at a high until the trailing edge of clock pulse 4 when the level of read state II (010) ($f$) returns to a low level. The trailing edge of clock pulse 4 also changes the level of read state III; i.e., RSIII (011) ($g$), to a high-level This change in levels changes the read control state machine 5–49 from read state II (010) 8–49–2 to read state III (011) 8–49–3. During the change from read state II 8–49–2 to read state III 8–49–3, counter B 5–43 of FIG. 5 is reset; i.e., RSIII is true.

The level of read state III (011) ($g$) remains at a high-level until the trailing edge of clock pulse 5 when the level of read state IV; i.e., RSIV (100) ($h$), goes to a high level. This change in levels, causes the read control state machine 5–49 to change from read state III (011) 8–49–3 to read state IV (100) 8–49–4. During the change in states from III to IV, the contents of counter A 5–41 of FIG. 5 are transferred to counter B 5–43 by AND gates 5–117 when RSIV is true.

Read state IV the trailing 100) (*h*) remains at a high-level until the trailing edge of clock pulse 6. At the trailing edge of clock pulse 6, the level of read state IV (100) (*h*) returns to a low level and the level of read state V; i.e., RSV (101) (), goes to a high level. This change in levels causes the read control state machine 5–49 to go from read state IV (100) 8–49–4 to read state V (101) 8–49–5. During the change from read state IV (100) 8–49–4 to read state V (101). 8–49–5, counter A 5–41 of FIG. 5 is reset to a zero count. The resetting of counter A 5–41 to a zero count is accomplished by RSV being gated by OR gate 5–127 when RSV is true. The level of read state V (101) (*j*) remains at a high-level until the trailing edge of clock pulse ($n/2+2$. In read state V, counters A 5–41, B 5–43 and C 5–45 begin counting at clock pulse 7. During clock pulses 1 through 6, all of the counters are inhibited from counting. RSV is true and is gated by OR gate 5–121 to a two-input AND gate 5–123. The second input to the AND gate 5–123 is the clock. The output of the AND gate 5–123 is fed to counters, A 5–41, B 5–43, and the mod seven counter 5–47 which in turn counts down counter C 5–45.

Since the counters of the system are inhibited from counting for six clock pulses, it would appear that an error exists in the counts of counters A 5–41, B 5–43 and C 5–45. The total count in counter A 5–41 at the end of period $T_i$ is $T_{i16}$. The contents of counter A 5–41 are then transferred to counter B 5–43 which now contains the value of $T_{i16}$. The next period to be counted in counter A 5–41 is the period of $T_{i+1}$. Since the counters are also inhibited in this instance for six clock pulses, the count in counter A 5–41 at the end of period of $T_{i+1}$ is $T_{i+11n6}$. Since counter B 5–43 counts simultaneously with counter A 5–41, the count in counter B 5–43 at the end of the period $T_{i+1}$ is $(T_{i16})+(T_{i+116})$. The total count therefore in counter B 5–43 is $(T_i+T_{i+1})-12$. The amount transferred into counter C 5–45 is one-half the amount of counter B 5–43, $$[(T_i+T_{i+1})-12]/2=[(T_i+T_{i+1})]/2-6.$$

In the ideal situation, with no pulses required for timing and the above-identified housekeeping routines, the amount transferred into counter C 5–45 would be $(T_i+T_{i+1})/2$. In the ideal embodiment and where one-half of the contents of counter B 5–43 are transferred to counter C 5–45 and are then counted down by the mod seven counter 5–47, the contents of counter C 5–45 at the end of six clock pulses would be $[(T_i+T_{i+1})/2a-6]$. This is the same value which is transferred to counter C 5–45 and which is in counter C at the end of six pulses in the present embodiment due to the inhibiting of counting for six pulses. Therefore, no correction in counters A 5–41, B 5–43, and C 5–45 is needed; as the error in counters A 5–41 and B 5–43 is self correcting in counter C 5–45. A similar result is arrived at in the embodiment where the complement of one-half of the contents of counter B 5–43 are transferred into counter C 5–45.

Between the trailing edge of clock pulses $n/2$ and $(n/2)+1$ the output signal level of the read amplifier (*b*) changes. The level change in the read amplifier output (*b*)from a high level to a low level occurs, as shown, after the trailing edge of $(n/2)$ but before the trailing edge of $(n/2)+1$. The change in levels indicates the zero crossover point of the data signal as received from the read amplifier 5–23.

After the trailing edge of $(n/2)+1$, the level of the sync data flip-flop output (*c*) changes from a low level to a high level. At the trailing edge of $(n/2)+2$ the level of read state V (101) (*j*) changes from a high level to a low level and the level of read state VI; i.e., RSVI (110) (*k*), changes from a low level to a high level. This change in respective levels results in a change of states from read state V (101) 8–49–5 to read state VI (110) 8–49–6. RSVI is then gated OR gate 5–121 to AND gate 5–123 and gated to the counters to continue the counting of the counters.

After the trailing edge of $(n/2)+3$, the level of read state VI (110) (*k*) goes to a low level and the level of read state VII; i.e., RSVII (111) (*m*), goes from a low level to a high level. The change in levels of the respective states causes a change in states in the read control state machine 5–49 from read state VI (110) 8–49–6 to read state VII (111) 8–49–7. RSVII is gated by OR gate 5–121 and by AND gate 5–123 with the clock pulses to keep the counters counting.

The level of read state VII (111) (*m*) stays at a high-level until the trailing edge of $(n/2)+4$ and then it returns to a low level. The level of read state 0; i.e., RSO (000) (*d*), then goes to a high level at the trailing edge of $(n/2)+4$. The change in levels changes the states of the read control state machine 5–49 from read state VII (111) 8–49–7 to read state 0 (000) 8–49–0. The counters continue counting during the transitions from read states V 8–49–5 to VI 8–49–6 to VII 8–49–7 to 0 8–49– AS RSV, RSVI, RSVII and RSO are all inputs into OR gate 5–121. The output of the OR gate 5–121 is gated with the clock pulses to keep the counters counting. The counters will continue counting while in read state 0 8–49–0 until the end of the period of the data bit being measured, clock pulse *n*, is detected. The interrogation of the ninth-bit-position flip-flop 5–45–8 in counter C 5–45 takes place at clock pulse 2 of the next bit when RSI is true to determine if the bit just measured has a binary value of "1" or "0".

The above described preferred digital embodiment provides for the direct digital measurement of value periods with the number of value periods approaching *n*. The preferred digital embodiment further provides the capability of utilizing an *n* number of thresholds for an $(n+1)$ order of code. The use of multiple thresholds and higher order codes allows for the use of multiple frequencies in practicing the subject invention. The analog embodiment of the present invention employs the transducer 5–19 and the read amplifier 5–23 of the digital embodiment. From that point on, the computation is performed using analog means.

Figure 12:
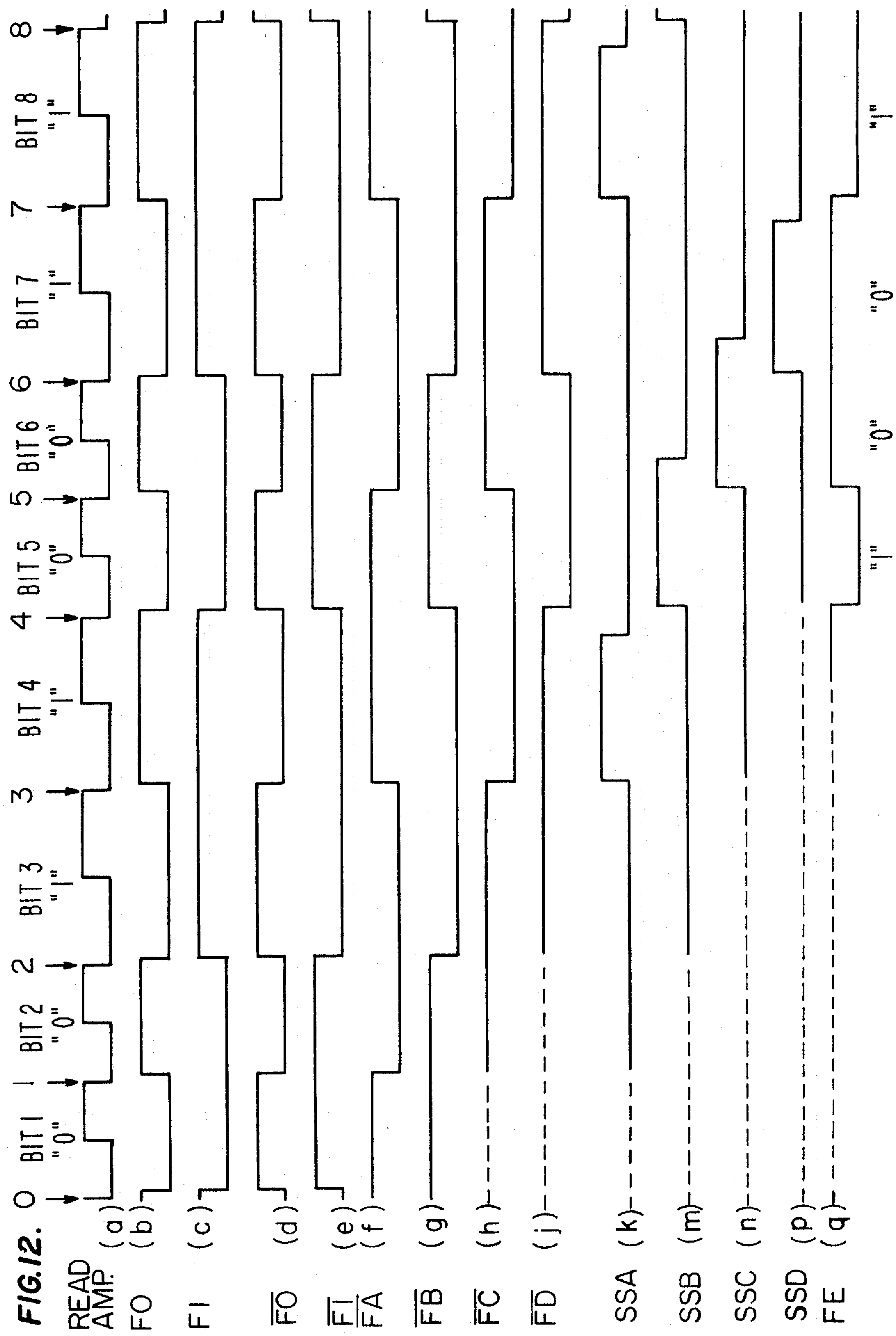
FIG. 12 is a timing diagram of the applicant's analog measurement and decision logic.

Referring to FIGS. 10 and 10A, the read control state machine 10–49 of the analog embodiment consists of two flip-flops, (FF0) 10–51 and (FF1) 10–53. The analog read control state machine 10–49 has four states; state 0; i.e., RSO (00), state I; i.e., RSI (10), state II; i.e., RSII (01), and state III; i.e., RSIII (11). The states of the analog read state machine 10–49 change with each bit of data as is shown in FIG. 12.

Figure 11:
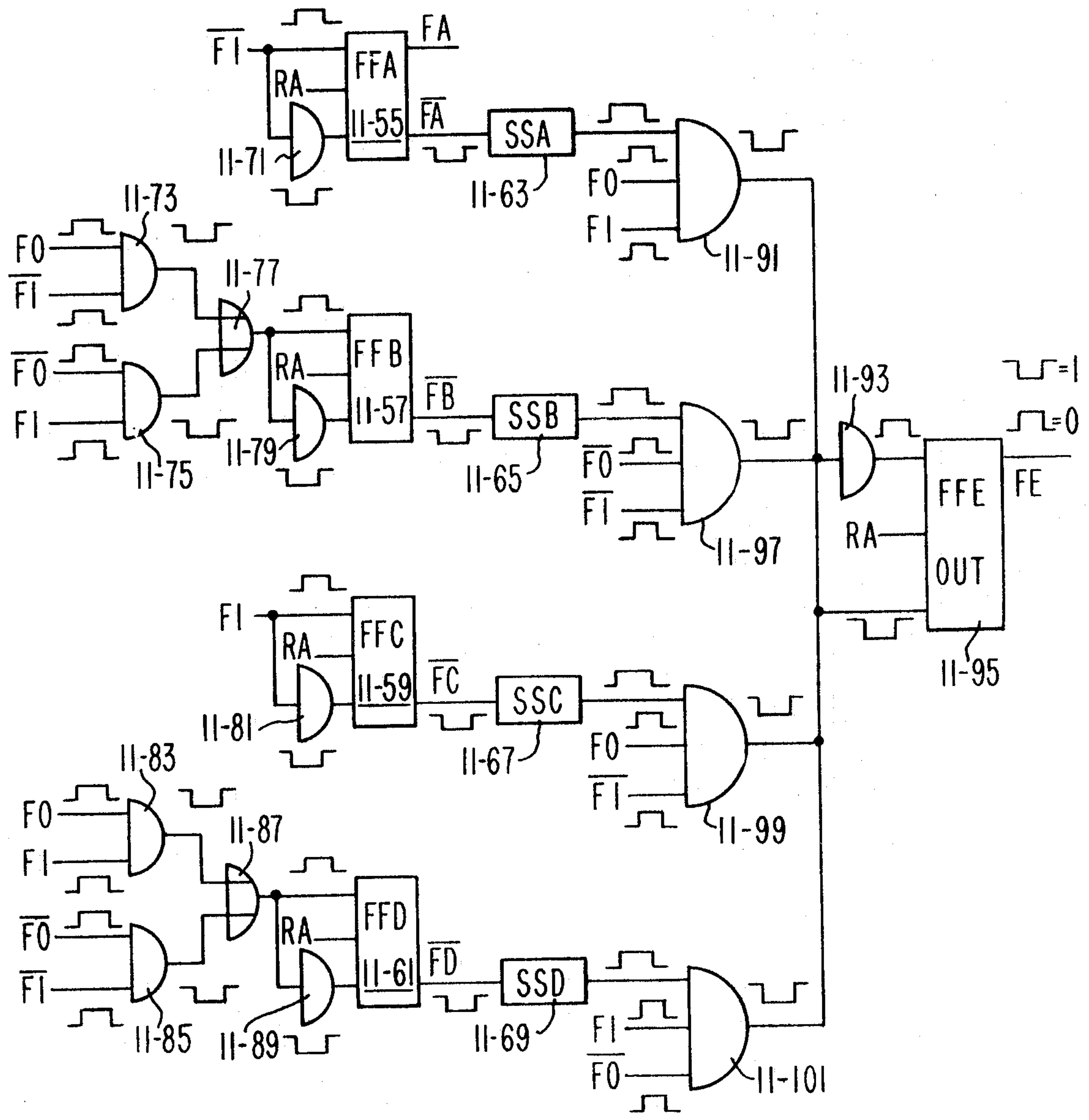
FIG. 11 is a block diagram of theapplicant's analog measurement and decision logic.

Referring now to FIG. 11, there is shown a detailed schematic diagram of the analog embodiment of the subject invention. The analog circuitry means preferably comprises a series of integrators which are shown as single shot multivibrators 11–63, 11–65, 11–67, 11–69. The present embodiment utilizes four such single shots 11–63, 11–65, 11–67, 11–69 whose operation will be described hereafter.

The read control state machine 10–49 of the analog embodiment changes states with each data bit and each state has a duration equal to the period of the data bit which changed the read control state machine 10–49 to said state. The threshold value is determined by charging a single-shot multivibrator for a period of time, said time being a function of preceding bits of data. In the present embodiment, the single-shot multivibrator is charged during the periods of the two data bits immediately preceding the data bit being evaluated. This is not intended to limit the charging time of the single-shot multivibrator to the period of two preceding data bits as the periods of one or more data bits or portions thereof may be used. The single-shot multivibrator is controlled, for example, by a transistor or diode, to charge to a threshold value dependent upon the value of the two preceding data bits in accordance with the aforementioned principles of the subject invention. The charged single-shot multivibrator is discharged and its period, the threshold value, is compared with the period of the data bit being evaluated to determine the value of said data bit.

The value of the data bit being measured is "0" if the period of the bit being measured ends before the discharge period of the single-shot ends. Likewise, the value of a data bit being measured is a binary "1" if the discharge period of the single-shot ends before the period of the data bit ends.

The input into the analog read control state machine 10–49 is the amplified data bit stream from the read amplifier 5–23. The states of the read control state machine 10–49 are changed by the trailing edge of each data bit. Referring to FIG. 12, this is evidenced by comparing the bits of data designated as "read amp" (*a*) with the outputs of the state machine, FO (*b*), F1 (*c*), $\overline{\mathrm{FO}}$ (*d*), $\overline{\mathrm{F1}}$ (*e*). The change in state of the outputs (*b*), (*c*), (*d*), (*e*) of the read-state machine occurs slightly after the trailing edge of the data bit. The outputs F1 (*c*) and $\overline{\mathrm{F1}}$ (*e*) require two bits of data to change status as they are the outputs of the second flip-flop (FF1) 10–53 of the analog read control state machine 10–49.

The outputs of the analog read control state machine, illustrated in FIG. 10, are gated into the analog measuring and comparing circuit illustrated schematically in FIG. 11. The analog measuring and comparing circuit may comprise a series of flip-flops 11–55, 11–57, 11–59, 11–61 utilizing the outputs (*b*), (*c*), (*d*), (*e*) of the read-control state machine 10–49 as inputs. The outputs (*f*), (*g*), (*h*), (*j*) of the flip-flops 11–55, 11–57, 11–59, 11–61 are then sent to integrators, single-shot multivibrators 11–63, 11–65, 11–67, 11–69, whose outputs (*k*), (*m*), (*n*), (*p*) in turn are compared with the period of the bits of data to be evaluated.

In its preferred embodiment, the analog measuring and comparing circuit comprises four flip-flops 11–55, 11–57, 11–59, 11–61 which serve as inputs to four integrators 11–63, 11–65, 11–67, 11–69. The integrators may be a single-shot multivibrator, hereafter referred to as single shots, which are well known in the art. The comparator of the analog measuring and comparing circuit is a flip-flop 11–95 which is responsive to the gated output of a selected single shot and the data bit presently being evaluated.

Referring now to FIG. 12, there is shown a timing diagram which will facilitate the detailed explanation of the operations of the circuits of FIGS. 10 and 11. The outputs of the read amplifier 5–23 are fed into the analog read control state machine 10–49 whose outputs, in turn, control an assortment of gates in the analog circuit of FIG. 11.

In read state 0; i.e., RSO (00), the outputs of the read-control state machine 10–49, F0 (*b*) and F1 (*c*), are both at a low level. $\overline{\mathrm{F0}}$ (*d*) and $\overline{\mathrm{F1}}$ (*e*), being the opposite sides of the outputs of the flip-flops in the read control state machine 10–49, are at a high level. Read state 0 (00) is the state in FIG. 12 having the duration of the period of bit 1; i.e., between 0 and 1. Read state I; i.e., RSI (10), has the period of bit 2, from 1–2 in FIG. 12. $\overline{\mathrm{F1}}$ (*e*), which is at a high level for the periods of bits 1 and 2; i.e., read states RSO and RSI, serves as an input to the first flip-flop FFA 11–55 in the analog measuring and comparing circuit. $\overline{\mathrm{F1}}$ (*e*) also passes through an inverter 11–71 and serves as a second input to the first flip-flop FFA 11–55. The remaining input to the first flip-flop FFA 11–55 is supplied by the read amplifier RA (*a*). The output of the first flip-flop FFA 11–55, $\overline{\mathrm{FA}}$ (*f*), is fed into a first single shot SSA 11–63. The output $\overline{\mathrm{FA}}$ (*f*) goes to a low level after the period from 0 to 1, the period of bit 1, and stays at said low level for the periods of the next two bits, bits 2 and 3. During this time single shot SSA 11–63 is being charged to the threshold value.

The trailing edge of bit 1 changes the state of the analog read control state machine 10–49 from read state 0; i.e., RSO (00), to read state I; i.e., RSI (10). In read state RSI, F0 (*b*) is at a high level and F1 (*c*) is at a low level. F0 (*b*) and $\overline{\mathrm{F1}}$ (*e*) both being at a high level are gated into a NAND gate 11–73 and $\overline{\mathrm{F0}}$ (*d*) and F1 (*c*), which will be at a high level during the next state of the read-control state machine 10–49, read state II, are gated into a separate NAND gate 11–75. The outputs of the 2 NAND gates 11–73, 11–75 are fed into a NOR gate 11–77. This gating arrangement will result in a high level input into the second flip-flop FFB 11–57 for two consecutive periods, the periods of bits 2 and 3. This is similar to the high level input into the first flip-flop FFA 11–55 for the periods of bits 1 and 2. The same outputs of the read-control state machine 10–49 are inverted and serve as a second input to the second flip-flop FFB 11–57; the final input being the output of the read amplifier RA (*a*). Output $\overline{\mathrm{FB}}$ (*g*) of the second flip-flop FFB 11–57 is fed into single shot SSB 11–65. Output $\overline{\mathrm{FB}}$ (*g*) changes to a low level from a high level at the trailing edge of bit 2 and remains at the low level for the periods of the next two data bits, bits 3 and 4. During this time, the second single shot SSB 11–65 is being charged. The single shots of the preferred embodiment are charged for the periods of two succeeding data bits. This is particularly evident by the gating arrangement of flip-flops FFB 11–57 and FFD 11–51 where "-NOR" gates 11–77, 11–87 are utilized to ensure that the outputs of two consecutive states of the analog read control state machine are fed into each flip-flop.

The trailing edge of bit 2 changes the state of the analog read control state machine 10–49 to read state II; i.e., RSI (01), and the trailing edge of bit 3 changes the state of the read control state machine 10–49 to state III; i.e., RSIII (11). The inputs into the third flip-flop FFC 11–59 are F1 (*c*) which remains at a high value for the periods of bits 3 and 4, read states RSII and RSIII, and the output of the read amplifier RA (*a*). The output $\overline{\mathrm{FC}}$ (*h*) of the third flip-flop FFC 11–59 goes to a low level at the trailing edge of bit 3 and remains at a low level during the periods of bits 4 and 5. The output $\overline{\mathrm{FC}}$ (*h*) of the third flip-flop FFC 11–59 is fed into the third single shot SSC 11–67 which will be charged during the periods of bits 4 and 5.

At the trailing edge of bit 3, the state of the analog read control state machine 10–49 changes to read state III; i.e., RSIII (11), and the outputs F0 (*b*) and F1 (*c*) of the analog read control state machine are both at a high level. F0 (*b*) and F1 (*c*) are fed into a NAND gate 11–83 as they both remain at a high level for the duration of bit 4, the period from 3 to 4. $\overline{\mathrm{F0}}$ (*d*) and $\overline{\mathrm{F1}}$ (*e*) are fed into NAND gate 11–85 and they are both at a high level during the duration of bit 5, the period from 4 to 5. The outputs of these two NAND gates 11–83, 11–85 are fed in a NOR gate 11–87 the output of which serves as an input to the fourth flip-flop FFD 11–61. As a result of this gating, one input into the fourth flip-flop FFD 11–61 will be positive for the duration of bits 4 and 5. The output of the NOR gate 11–87 is also fed into an inverter 11–89 and the inverted output serves as a second input into the fourth flip-flop FFD 11–61. The remaining input into the fourth flip-flop FFD 11–61 is the output of the read amplifier RA (*a*).

The output $\overline{\mathrm{FD}}$ (*j*) of the fourth flip-flop FFD 11–61 goes to a low level at the trailing edge of bit 4 and remains at that level until the trailing edge of bit 6. The output $\overline{\mathrm{FD}}$ (*j*) serves as an input to the fourth single shot SSD 11–69 allowing single shot SSD 11–69 to charge during the duration of bits 5 and 6.

At the trailing edge of bit 3, the level of $\overline{\mathrm{FA}}$ (*f*) changes and the output of the first flip-flop FFA 11–55 goes from a low level to a high level. As a result, the first single shot SSA 11–63 which was being charged during the periods of bits 2 and 3 is now discharged. The output of the first single shot SSA (*k*) is at a high level and is fed into a three input NAND gate 11–91. The remaining two inputs to the NAND gate 11–91 are F0 (*b*) and F1 (*c*). F0 (*b*) and F1 (*c*) are the outputs of the analog read state machine 10–49 indicative of read state III; i.e., RSIII (11). F0 (*b*) and F1 (*c*) remain at a high level for the duration of the period of bit 4 and thus represent the period of bit 4 which is to be evaluated. After the trailing edge of bit 4, F0 (*b*) returns to a low level. The three input NAND gate 11–91 provides a negative output for the period when the output of single shot SSA (*k*), F0 (*b*) and F1 (*c* ) are all at a high level.

The output of the NAND gate 11–91 is then fed through an inverter 11–93 and into the output flip-flop FFE OUT 11–95. The other inputs into the output flip-flop FFE OUT 11–95 are the uninverted output of the NAND gate 11–91 and the output of the read amplifier RA (*a*). The resulting output FE (*q*) of the output flip-flop FFE OUT 11–95 is either high or low depending on whether the period of the bit being measured has a period longer or shorter in duration than the discharge period of single SSA (*k*), the threshold value. In this instance, the bit being measured is bit 4. If the period of the data bit being evaluated has a period longer in duration than the discharge period of the single shot SSA (*k*), then the output FFE (*q*) of the output flip-flop FFE OUT 11–95 will have a low value indicating that the binary value representing bit 4 is "1." If the period of the data bit being evaluated has a period shorter in duration than the discharge period of the single shot SSA (*k*), the threshold value, the output FE (*q*) of output flip-flop FFE OUT 11–95 will be at a high level indicating that the binary value of the data bit is "0." In the instance of FIG. 12, the bit being measured, bit 4, has a period longer in duration than the period of the discharge period of the single shot SSA (*k*). The trailing edge of bit 4 causes the output FE (*q*) of the output flip-flop FFE OUT 11–95 to go to a low level indicating that the binary value representative of bit 4 is "1."

If the discharge period of a single shot is shorter in duration than the period of either of the remaining two inputs to the NAND gate 11–91, 11–97, 11–99, 11–101, the output of the NAND gate will cease to be at a low level prior to the trailing edge of the bit being measured. This means that the input to the output flip-flop FFE OUT 11–95 will be at a low level at the trailing edge of the bit being measured. As a result, the output flip-flop FFE OUT 11–95 which changes at the trailing edge of each bit of data received from the read amplifier, will produce an output FE (*q*) which is at a low level in response to the low-level input at the time of changing states. If the discharge period of the single shot is longer than the period of either of the two remaining inputs to the NAND gate, the output of the NAND gate will be at a low level and the input to flip-flop FFE OUT 11–95 at a high level when the output flip-flop FFE OUT 11–95 changes and the output FE (*q*) of the output flip-flop FFE OUT 11–95 will be at a high level in response to the input at the trailing edge of the period of the bit being measured. It can, therefore, be said that the comparison of the period of the data bit being evaluated takes place in the NAND gates 11–91, 11–97, 11–91, 11–101 with the results being exhibited at the output FE (*q*) of the output flip-flop FFE OUT 11–95.

The trailing edge of bit 4 causes the analog read control state machine to change states to read state 0; i.e., RSO (00). The output of the analog read control state machine $\overline{\text{FI}}$ (*e*) is once again at a high level and will remain at this high level for the periods of bit 5 and 6. $\overline{\text{FI}}$ (*e*) serves as the input to the first flip-flop FFA 11–55 whose output $\overline{\text{FA}}$ (*f*) goes to a low level at the trailing edge of bit 5 and remains at said low level for the duration of the periods of bits 6 and 7. This input is fed into the first single shot SSA 11–63 to charge it.

The trailing edge of bit 4 also causes the second single shot SSB 11–65 to discharge as a result of output $\overline{\text{FB}}$ (*q*) of the second flip-flop FFB 11–57 returning to a high level. The discharge of single shot SSB (*m*) is fed into a three input NAND gate 11–97; the other two inputs being $\overline{\text{FO}}$ (*d*) and $\overline{\text{FI}}$(*e*). $\overline{\text{FO}}$ (*d*) and $\overline{\text{FI}}$ (*e*) are representative of the period of the data bit being evaluated, bit 5. The output of the three input NAND gate 11–97 serves as one input into the output flip-flop FFE OUT 11–95 and also as an input to an inverter 11–93 whose output serves as the second input into the output flip-flop FFE OUT 11–95. The gating and the output flip-flop FFE OUT 11–95 provide a means for comparing the length of the period of bit 5 with the length of the discharge period of single shot SSB (*m*). The period of bit 5 being shorter in duration than the threshold period, the period of discharge of single shot SSB (*m*), the output FE (*q*) of the output flip-flop FFE OUT 11–95 goes to a high level at the trailing edge of bit 5 indicating that the binary value of data bit 5 is "0."

The trailing edge of bit 5 changes the state of the analog read control state machine 10–49 from read state 0; i.e., RSO (00), to read state I; i.e., RSI (10). At this time, the outputs FO (*b*), $\overline{\text{FI}}$ (*e*), and $\overline{\text{FO}}$ (*d*), FI (*c*) are fed into the second flip-flop FFB 11–57 with the output $\overline{\text{FB}}$ (*g*) changing at the trailing edge of bit 6 and charging the second single shot SSB 11–65 for the duration of the periods of bits 7 and 8. The trailing edge of bit 5 also discharges single SSC 11–67. The discharge of single shot SSC (*n*) is fed into a three input NAND gate 11–99 with FO (*b* ) and $\overline{\text{FI}}$ (*e*) being the other two inputs as FO (*b*) and $\overline{\text{FI}}$ (*e* ) are representative of bit 6 and remain at a high level for the duration of the period of bit 6 with FO (*b* ) and $\overline{\text{FI}}$ (*e*) returning to a low level at the trailing edge of bit 6. The period of data bit 6 is shorter in duration than the discharge period of single shot SSC (*n*). As a consequence, output FE (*q*) of the output flip-flop FFE OUT 11–95 remains at a high level indicating that the binary value of data bit 6 is "0."

The trailing edge of bit 6 changes the state of the analog read control state machine 10–49 to read state II; i.e., RSII (01), and the output FI (*c*) of the analog read control state machine 10–49 is fed into the third flip-flop FFC 11–59. Output $\overline{\text{FC}}$ (*h*) of the third flip-flop FFC 11–59 changes to a low level at the trailing edge of bit 7 and remains at the low level for the periods of bits 8 and 9, to allow single shot SSC 11–67 to charge. The trailing edge of bit 6 discharges the fourth single shot SSD 11–69 which has been charging for the periods of bits 5 and 6. The output of single shot SSD (*p*) is fed into a three-input NAND gate 11–101. The remaining inputs to the NAND gate 11–101 are FI (*c*) and $\overline{\text{FO}}$ (*d*) which are representative of bit 7 and remain at a high level for the duration of bit 7. The output of the NAND gate 11–101 is at a low level and is fed into the inverter 11–93. The output of the inverter 11–93 is fed into the output flip-flop FFE OUT 11–95. The output of the NAND gate 11–101 also serves as an input to the output flip-flop FFE OUT 11–95. The remaining input to the output flip-flop FFE OUT 11–95 is the output of the read amplifier RA (*a*). The period of data bit 7 is longer in duration than the discharge period of single-shot SSD (*p*); consequently, the output of the three input NAND gate 11–101 will be at a low level prior to the trailing edge of bit 7. As a result, the output FE (*q*) of the output flip-flop FFE OUT 11–95 will change to a lower level at the trailing edge of bit 7. This low level output indicates that the binary value representative of bit 7 is "1." The remaining bits of data are similarly evaluated.

In the analog embodiment, there is a period of time between the discharging of a single shot and the next charging of the same single shot where there is no activity in the single shot. This time is known as "dead time" and it is the result of utilizing four single shots. If three single shots were used, there would be no dead time, but a series of three or more consecutive bits having the values of "0" would not allow each single shot to charge for two full periods. As a result, four single shots are employed which provide a capability for handling an infinite number of consecutive bits with the binary value of "0" or any other value with only a small amount of "dead time" resulting.

The analog embodiment, like the above-described digital embodiment, is capable of utilizing a variety of frequencies and numerous threshold value to accommodate higher order codes. The recording data on a magnetizable surface in accordance with the principles of the subject invention is accomplished by the circuit of FIG. 5. Input data is fed into a write data source 5–103 which encodes the binary "1"'s and "0"'s into a series of data pulses of specific lengths or periods. The binary "1 "'s are encoded to be pulses having a period of 300 microseconds and the binary "0"'s are encoded to be pulses having a period of 224 microseconds. The binarily encoded pulses are synchronized with the clock pulses and together they enter a write control state machine 5–105.

The write control state machine 5–105 serves to control the gating of data in the write portion of the circuit of FIG. 5. The write control state machine 5–105 is composed of two flip-flops having three states; write state 0; i.e., WSO (00), write state I; i.e., WSI (01), and write state II; i.e., WSII (11). The input of synchronized data and clock pulses to the write control state machine 5–105 operates to change the states of the write state machine 5–105.

Counter A 5–41 of FIG. 5 is utilized in the encoding of data which is to be recorded on the magnetizable surface. At the start of a bit of data, the write control state machine 5–105 is in write state 0 (00) and counter A 5–41 begins counting. The output of counter A 5–41 is fed into a count encoder 5–107 which comprises a flip-flop. The flip-flop of the count encoder 5–107 produces a pulse which is at a high level for a count of 56 in counter 5–41. This count of 56 is equal to 112 microseconds as a 2 microsecond clock 5–37 is employed. After reaching a count of 56 in counter A 5–41, the output of the flip-flop in the count encoder 5–107 changes to a low level and counter A 5–41 continues counting to a count of 112 (224 microseconds). At a count of 112 in counter A, the state of write control state machine 5–105 changes to write state I; i.e., WSI (01), only if the data bit has a binary value of "0." Write state I; i.e., WSI (01), inhibits the further counting of counter A 5–41 and changes the level of the flip-flop in the count encoder 5–107. The change in states from write state 0 to write state I signifies the end of a data bit. If the data bit has a binary value of "1," counter A 5–41 continues counting to a count of 150 (300 microseconds) at which time the state of the write control state machine 5–105 changes to write state I; i.e., WSI (01), halting the count of counter A 5–41 and changing the level of the output of the flip-flop in the count encoder 5–107. The next clock pulse changes the state of the write control state machine 5–105 to write state II; i.e., WSII (11). The output of write state II; i.e., WSII (11), enters OR gate 5–127 and resets counter A 5–41 to zero. Counter A 5–41 is now ready for the next bit of data and will start counting when the write state machine changes to write state 0, i.e. WSO (00).

The output of the count encoder 5–107 is then fed to an amplifier 5–109 where it is amplified and then fed to the transducer 5–19. The output of the amplifier 5–109 is also fed into a two-input AND gate 5–11. The other input to the AND gate 5–11 is a feedback from the transducer 5–19. The output of the AND gate 5–11 is fed to a write error detect 5–113 which upon sensing an error sends a signal to a write control. The write error detect 5–113 can be any known error detection technique, for example, parity check.

The above described digital method of encoding encodes data to be recorded on a magnetic surface by a direct measurement of a period representative of said data. The invention is not limited to the use of a single full period as portions of a period or multiple periods may be used in encoding and recording data on a magnetizable surface.

It will be understood that various changes in the details, materials, steps and arrangements of components, which have been herein described and illustrated in order to explain the nature of the invention, may be made by those skilled in the art within the principle and scope of the invention which is described with particularity in the appended claims.

What I claim is:

1. Apparatus for reading and recovering data previously stored as magnetic information bits on a magnetizable surface, said apparatus comprising transducer means for generating electric information signals during relative movement between said transducer and said surface, each said electric information signal having a period proportional to its encoded data value in a predetermined numbering system, period detection means for determining the time duration of the period of each electric information signal generated by sad transducer means, storage means for storing a constant proportional to the time duration of the period of at least a portion of a next preceding prior information signal read by said transducer, and comparator means responsive to said storage means and the value of the period for each information signal for comparing the time duration of each successive electric information signal as it is read with the stored prior period constant to detect and denominate the content of each said information signal.

2. The apparatus defined in claim 1 wherein said data is encoded in binary form and wherein the ratio of the period of a binary "1" signal to the period for a binary "0" signal is in the order of 1.34.

3. The apparatus defined in claim 1 wherein said period detection means and said storage means comprise a plurality of cascaded bistable elements and wherein said comparator means comprises digital logical circuitry.

4. The apparatus defined in claim 1 wherein said storage means comprises a plurality of sequentially energizable capacitor elements and wherein said comparator means comprises logical gating means for comparing the relative analog charge level on capacitors functionally related to the present information signal and the previous period information signal, respectively.

5. The apparatus defined in claim 1 wherein said data is encoded in an $n+1$ order code and said storage means stores $n$ constants proportional to the time duration of the period of at least a portion of a next preceding prior information signal generated by said transducer.

6. The apparatus defined in claim 1 wherein said stored prior period constant is proportional to the time duration of the periods of two next preceding prior information signals ready by said transducer, said prior period constant being proportional in the order of 1, 7/8 and 7/6 when said data is encoded in binary form and said encoded data value of said two next preceding prior information signals is 01 or 10, 11 and 00 respectively.

7. Apparatus for reading and recovering data previously stored as magnetic bits on a magnetic surface, said apparatus comprising transducer means for generating electric information signals during relative movement between said transducer means and said surface, each of said electric information signals having a period proportional to its encoded data value in accordance with a predetermined numbering system, computing means responsive to said electric information signals for computing a prior period constant proportional to the duration of the periods of a predetermined number of next preceding electric information signals, and comparator means responsive to said computing means and each of said electric information signals for comparing said prior period constant with the period of each electric information signal as it is read to detect and denominate the data value of each of said electric information signals.

8. The apparatus defined in claim 7 wherein said computing means comprises a first means responsive to said electric information signals for counting and storing a count proportional to the time duration of said predetermined number of next preceding electric information signals, second means responsive to said first means for averaging said count of said first means and storing said averaged count, and altering means responsive to said averaged count and the encoded data value of said predetermined number of next preceding electric information signals for altering said averaged count to determine said prior period constant, said altering means including adding and subtracting means for varying the count of said averaged count.

9. The apparatus defined in claim 8 wherein said electric information signals are encoded in binary form and said averaged count is altered by adding to and subtracting counts from said averaged count to effectively multiply said averaged count by 1, 7/8, and 7/6 when said predetermined number of next preceding electric information signals is two and said next preceding information signals have the binary value of 01 or 10, 11 and 00 respectively.

10. The apparatus defined in claim 8 wherein said first means comprises a plurality of cascaded bistable elements;

said second means comprises logical gating circuitry for averaging by shifting said count of said first means a predetermined number of positions and a plurality of cascaded bistable elements for storing said averaged count, and said altering means comprises a variable count counter for altering the averaged count stored in said second means.

11. The apparatus defined in claim 7 wherein said computing means comprises a plurality of sequentially energizable capacitor elements and said prior period constant is an analog charge level being a function of the encoded data value of said predetermined number of preceding bits, said energizable capacitor elements being chargeable during the periods of said predetermined number of next preceding electric information signals to said analog charge level.

12. Apparatus for reading and recovering data previously stored as magnetic information bits on a magnetizable surface, said apparatus comprising:

transducer means for generating electric information signals during relative movement between said transducer means and said magnetizable surface, each of said electric information signals having a period proportional to its encoded data value in a predetermined numbering system period detection means responsive to said electric information signals for detecting the time duration of a period between selected zero-crossover points of each of said electric information signals generated by said transducer means, computing means operatively associated with said period detection means and operable to compute a constant proportional to a selected number of said detected periods of at least one next preceding electric information signal, and comparator means responsive to said computer means and said period detection means for comparing the time duration of the detected period of each electric information signal as it is read with the constant to detect and denominate the content of each electric information signal.

13. The apparatus defined in claim 12 wherein said encoded data value is in binary form, said detected period of an electric information signal having the binary encoded value of 1 has a duration of 300 microseconds, said detected period of an electric information signal having the binary encoded value of 0 has a duration of 224 microseconds and said preceding period constant has a duration of 262 microseconds.

14. Apparatus for reading and recovering encoded data previously stored on a magnetizable surface as variable period information bits, said apparatus comprising:

transducer means for generating electric information signals in response to relative movement between said transducer means and said surface, each of said electric information signals having a period proportional to its encoded data value in a predetermined numbering system, means for generating a pattern of clock pulses, control means responsive to said electric information signals generated by said transducer means and said clock pulses for generating control signals, first bistable counter means responsive to said control signals for counting a first count proportional to the periods of a predetermined number of next preceding electric information signals, logical gating means responsive to said control signals for performing an averaging operation of the periods of said predetermined number of next preceding electric information signals and generating a second count representative thereof, second bistable counter means associated with said logical gating means for storing said second count, said second count being transferred by said logical gating means in response to said control signals, variable counter means associated with said second bistable counter means and responsive to said control signals for varying said second count stored in said second bistable counter means, said variable counter means including means for effectively multiplying said second count stored in said second bistable counter means by a constant proportional to the encoded data values of said predetermined number of next preceding electric information signals, a resulting product of said effective multiplication being a threshold value proportional to said periods of said predetermined number of next preceding electric information signals, and comparator means associated with said variable counter means and responsive to said control signals for comparing said threshold value with the period of an electric information signal as it is being read, said comparator means including denominating means responsive to said control signals for designating a first value when said threshold value is greater than the period of said read electric information signal and a second value when said threshold value is less than the period of said read electric information signal.

15. The apparatus defined in claim 14 wherein said comparator means includes means responsive to said control signals for counting down said threshold value stored in said second bistable counter means for the period of said read electric information signal and means responsive to said control signals for interrogating said second bistable counter means after the period of said read electric information signal to determine the count remaining in said second bistable counter means, said remaining count being determinative of said first and said second values.

16. The apparatus defined in claim 15 wherein said second bistable counter means stores the complement of said threshold value and said comparator means counts up the complement of said threshold value.

17. The apparatus defined in claim 14 wherein said data is encoded in binary form, said predetermined number of next preceding electric information signals is two and said variable counter means effectively multiplies said second count by 1, 7/8 and 7/6 when the encoded data value of said next two preceding electric information signals is a binary "01" or "10,""11" and "00" respectively.

18. The apparatus defined in claim 17 wherein said electric information signals having a binary value of 1 have a period of 300 microseconds, said electric information signals having a binary value of 0 have a period of 224 microseconds, and said threshold value has a period of 262 microseconds.

19. The apparatus defined in claim 14 wherein variable counter means has a modulus other than the modulus of said second bistable counting means and said timing and control means comprises a multiple state control means for controlling sad first and second bistable counter means, said logical gating means, said variable counter means and said comparator means, said multiple states of said state control means being responsive to said electric information signals.

20. Apparatus for sequentially reading and recovering encoded data previously stored on a magnetizable surface as variable period duration information bits, said apparatus comprising transducer means for generating electric signals during relative movement between said transducer and said magnetizable surface, each said electric signal having a period proportional to its value in a predetermined numbering system, oscillator means for generating a pattern of clock pulses, timing means responsive to an electric signal from said transducer means and pulses from said oscillator means for generating a pattern of logical timing signals, first bistable counter means responsive to said timing means and said oscillator means for generating a count for each electric information signal generated by said transducer, said count being proportional to the respective period of each said electric signal generated by said transducer, second bistable counter means responsive to the count stored in said first counter means for periodically registering a prior period constant count proportional to the average of the duration of the periods of at least two of the next preceding electric information signals generated by said transducer, and comparator means for determining the value of said sequentially read electric signals by comparing the period of each such electric signal with the previously stored prior period constant.

21. A method of encoding data for recording on a magnetizable surface comprising the steps of selectively generating one of a plurality of single-cycle variable period write current waveforms for each bit of data to be encoded, wherein each such period of said plurality of variable period waveforms corresponds to a predetermined data value in a predetermined numbering system, and applying said selectively generated single-cycle variable period waveforms to a write coil of a transducer.

22. The method of claim 21 additionally including the step of temporarily storing data which is expressed in a first numbering system and which is to be encoded and recorded and wherein the step of selectively generating an individual current waveform for each respective value of data includes the step of selectively generating a write current waveform having a predetermined period determined in accordance with the respective value of the data to be encoded.

23. The method of claim 21 wherein the data to be encoded is expressed in binary form and wherein the step of selectively generating variablè period current waveforms comprises the step of generating a current waveform of a first period for the binary "0" value and a second period for a binary "1" value, respectively and wherein the ratio of the current waveform period of the binary "1" waveform to the binary "0" waveform is within the range of 1.2 to 1.8.

24. The method of claim 23 wherein the step of generating a current waveform of a first period for a binary "0" value and a second period for a binary "1" value comprises the step of generating first half periods in said first and second periods having a duration of 112 microseconds and second half periods having a duration of 112 microseconds and microseconds in said first and second periods respectively.

25. The method of recording data on a magnetizable substrate and recovering said previously recorded data comprising the steps of positioning magnetizable surface in cooperable juxtaposition with a read-write magnetic transducer, generating one of a predetermined plurality of single-cycle current waveforms for each bit of data to be recorded, the period of said single-cycle current waveform having a predetermined period determined by the value in a predetermined numbering system of the data to be recorded, successively applying said individual single-cycle current waveforms to a write coil of said read-write transducer, imparting relative motion between said magnetizable surface having previously recorded data bits thereon and said read-write transducer, determining the period of each waveform generated by a read coil of said transducer during relative movement between said magnetizable surface and said transducer, storing a constant proportional to a predetermined mathematical function of the duration of the period of at least one previously read waveform generated by the read coil of said transducer, and comparing the period of each waveform generated by said read transducer coil with said previously stored constant to determine the value of the data bit read by said transducer from said magnetic surface.

26. The method of claim 25 additionally including the step of modifying the value of said stored constant after each successive comparison step to reestablish the constant at a predetermined threshold detection value.

27. The method of claim 26 additionally including the steps of initially reading predetermined data values into said apparatus via said transducer at the beginning of each read operation, and establishing an initially known threshold value in response to said reading in of said predetermined data.

28. The method of recovering data previously recorded data on a magnetizable surface comprising the steps of positioning said magnetizable surface in cooperable juxtaposition with a magnetic transducer, imparting relative motion between said magnetizable surface having previously recorded data thereon and said transducer, determining the period of each waveform generated by said transducer during relative movement between said magnetizable surface and said transducer, storing a constant proportional to the duration of a predetermined number of previously read waveforms generated by said transducer, and comparing the period of each waveform generated by said read transducer with said previously stored constant to determine the value of the data read by said transducer from said magnetic surface.

29. The method of encoding data according to claim 21 wherein said step of selectively generating single-cycle variable period waveforms is characterized by maintaining a uniform period for one of the two half cycles of each such waveform while varying the period of the other half cycle of each such waveform in accordance with said predetermined data value of said predetermined numbering system.

30. The method of encoding data according to claim 21 wherein said step of selectively generating single-cycle variable period waveforms is characterized by generating a uniform first half cycle and a variable second half cycle in accordance with said predetermined data value of sad predetermined numbering system.

31. The method according to claim 25 wherein the step of comparing the period is characterized by recognizing a first binary value for a period less than the threshold value and recognizing a second binary value for a period greater than the threshold value.

32. The method according to claim 28 wherein said stored constant is determined by the steps of:

measuring the periods of a predetermined number of immediately preceding waveforms;

storing a value corresponding to the periods of said immediately preceding waveforms; and modifying said stored value in accordance with a predetermined mathematical scheme to compute said stored constant.

33. The method according to claim 32 comprising the additional step of computing a new stored constant for each waveform.

34. The method according to claim 28 wherein the step of comparing the period of each waveform is characterized by assigning a first data value to all waveforms having a period less than the stored constant and by assigning a second data value to all waveforms having a period greater than the stored constant.

UNITED STATES PATENT OFFICE
CERTIFICATE OF CORRECTION

Patent No. 3,597,752 Dated August 3, 1971

Inventor(s) Cornelius Eldert, et. al.

It is certified that error appears in the above-identified patent and that said Letters Patent are hereby corrected as shown below:

Column 1, line 74, "the applicant's", should read -- the applicants -- . Column 4, line 12, "$(T_{i1} + T_{i12}/2)$" should read -- $\frac{T_{i-1} + T_{i-2}}{2}$ -- ; lines 13, 14, "$T_{i11}$ and $T_{i12}$" should read -- $T_{i-1}$ and $T_{i-2}$ -- ; line 16, "$T_{i11}$ and $T_{i12}$", should read -- $T_{i-1}$ and $T_{i-2}$ -- ; line 30, "$(T_{i11}+T_{i12})/2$", should read -- $\frac{T_{i-1} + T_{i-2}}{2}$ -- ; line 33, "threshold which" should read -- threshold value which -- ; line 40, "$(T_{i11} + T_{i12})/2$" should read -- $\frac{T_{i-1} + T_{i-2}}{2}$ -- ; line 45, "$(T_{i11} + T_{i12})/2$", should read -- $\frac{T_{i-1} + T_{i-2}}{2}$ -- ; line 46, "in n multiply", should read -- in the multiply -- ; line 49, "7/6Xdo not", should read -- 7/6 X 224 do not -- ; line 75, "the values", should read -- the value -- . Column 6, line 8, "$T_{i12}$. Counter", should read -- $T_{i-2}$. Counter -- ; line 9, "$T_{i12}$ to" , should read -- $T_{i-2}$ to -- ; line 13, "$T_{i12}$, and", should read -- $T_{i-2}$, and --; line 15, "i.e. $T_{i11}$." , should read -- i.e. $T_{i-1}$. -- ; same line, "$T_{i11}$ counter B", should read -- $T_{i-1}$ counter B -- ; line 17, "$(T_{i12} + T_{i11})$" , should read -- $(T_{i-2} + T_{i-1})$ -- ; line 18, "$T_{i11}$. Counter", should read -- $T_{i-1}$. Counter -- ; line 24, "$A = (T_{i12} + T_{i11})/2$", should read -- $A = \frac{T_{i-2} + T_{i-1}}{2}$ -- ; line 32, "$T_{i11}$", should read -- $T_{i-1}$ -- ; line 33, "$T_{i12}$ and $T_{i11}$",

UNITED STATES PATENT OFFICE
CERTIFICATE OF CORRECTION

Patent No. 3,597,752 Dated August 3, 1971

Inventor(s) Cornelius Eldert, et. al. --2--

It is certified that error appears in the above-identified patent and that said Letters Patent are hereby corrected as shown below:

should read -- $T_{i-2}$ and $T_{i-1}$ -- . Column 7, line 5, "$T_{i11}$", should read -- $T_{i-1}$ -- ; line 7, "$(T_{i12} + T_{i11})/2$" should read -- $\frac{T_{i-2} + T_{i-1}}{2}$ - ; line 8, "$T_{i11}$ and $T_{i12}$", should read -- $T_{i-1}$ and $T_{i-2}$ -- ; line 54, "utilizable the read pulses", should read -- utilizable timing pulses -- ; line 55, "is the write use", should read -- is to use -- . Column 9, line 3, "IV 100) (h)", should read -- IV (100) (h) -- ; line 6, "(j) ( ), goes" should read -- (j), goes -- ; line 15, "(n/2 + 2.", should read -- $\frac{n}{2}$ + 2. -- ; line 26, "is $T_{i16}$", should read -- is $T_{i-6}$ -- ; line 28, "value of $T_{i16}$", should read -- value of $T_{i-6}$ -- ; line 32, "is $T_{i+11}$ a 6", should read -- is $T_{i+1-6}$ -- ; line 34, "$(T_{i16}) + (T_{i+116})$", should read -- $(T_{i-6}) + (T_{i+1-6})$ -- . Column 10, line 7, "and by AND gate", should read -- and gated by an AND gate -- ; line 17, "8-49- AS RSV", should read -- 8-49-0 as RSV -- . Column 12, lines 10, 11, "gating arrangement", should read -- gating arrangements; lines 16,17, "i.e., RSI (01)", should read -- i.e., RSII, (01) -- . Column 13, line 37, "11-91, 11-97, 11-91, 11-101", should read -- 11-91, 11-97, 11-99, 11-101 -- ; line 42, "$\overline{FI}$ (e)", should read -- $\overline{FI}$ (e) -- ; line 50, "$\overline{FB}$ (q)", should read -- $\overline{FB}$ (g) -- . Column 15, line 63, "by sad transducer", should read -- by said transducer -- ; Column 16, line 22, "ready by said", should read -- read by said -- . Column 18, lines 46,47, "controlling sad first", should read -- controlling said first -- ; Column 19, line 37, "an microseconds", should read -- and 188 microseconds -- . Column 20, line 40, "of sad predetermined"

UNITED STATES PATENT OFFICE

CERTIFICATE OF CORRECTION

Patent No. 3,597,752 Dated August 3, 1971

Inventor(s) Cornelius Eldert, et. al., --3--

It is certified that error appears in the above-identified patent and that said Letters Patent are hereby corrected as shown below:

should read -- of said predetermined -- .

Signed and sealed this 12th day of December 1972.

(SEAL)
Attest:

EDWARD M.FLETCHER,JR.
Attesting Officer

ROBERT GOTTSCHALK
Commissioner of Patents